Oct. 25, 1938.                L. M. KEEFE                2,134,284
                       RECORD CONTROLLED MACHINE
                       Filed March 3, 1934          8 Sheets-Sheet 1

INVENTOR
LINCOLN M. KEEFE
BY
Van Deventer + Grier
ATTORNEYS

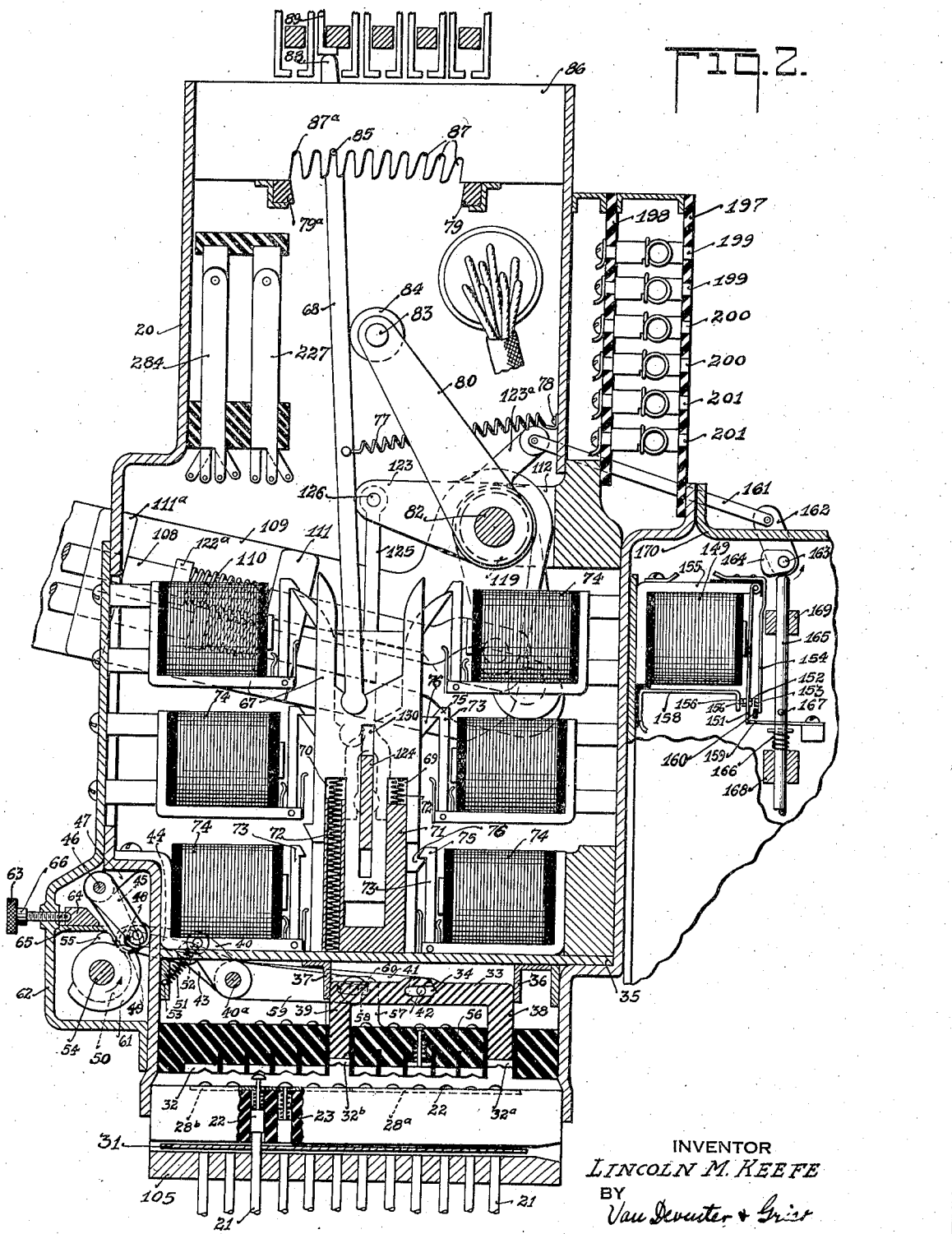

Oct. 25, 1938.    L. M. KEEFE    2,134,284
RECORD CONTROLLED MACHINE
Filed March 3, 1934    8 Sheets-Sheet 3
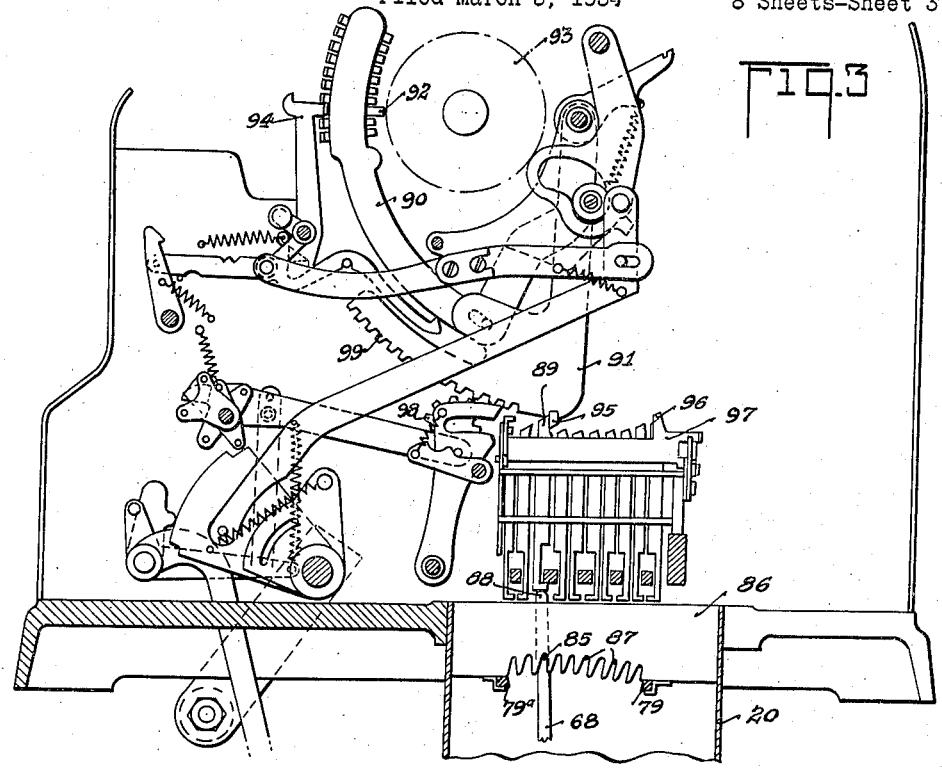
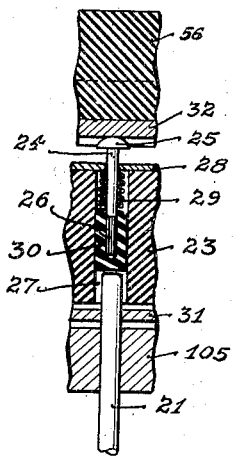
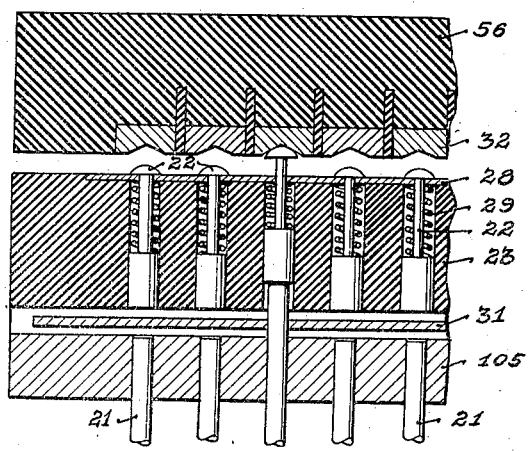
INVENTOR
LINCOLN M. KEEFE
BY
Van Deventer & Grier
ATTORNEYS Oct. 25, 1938.   L. M. KEEFE   2,134,284
RECORD CONTROLLED MACHINE
Filed March 3, 1934   8 Sheets-Sheet 4
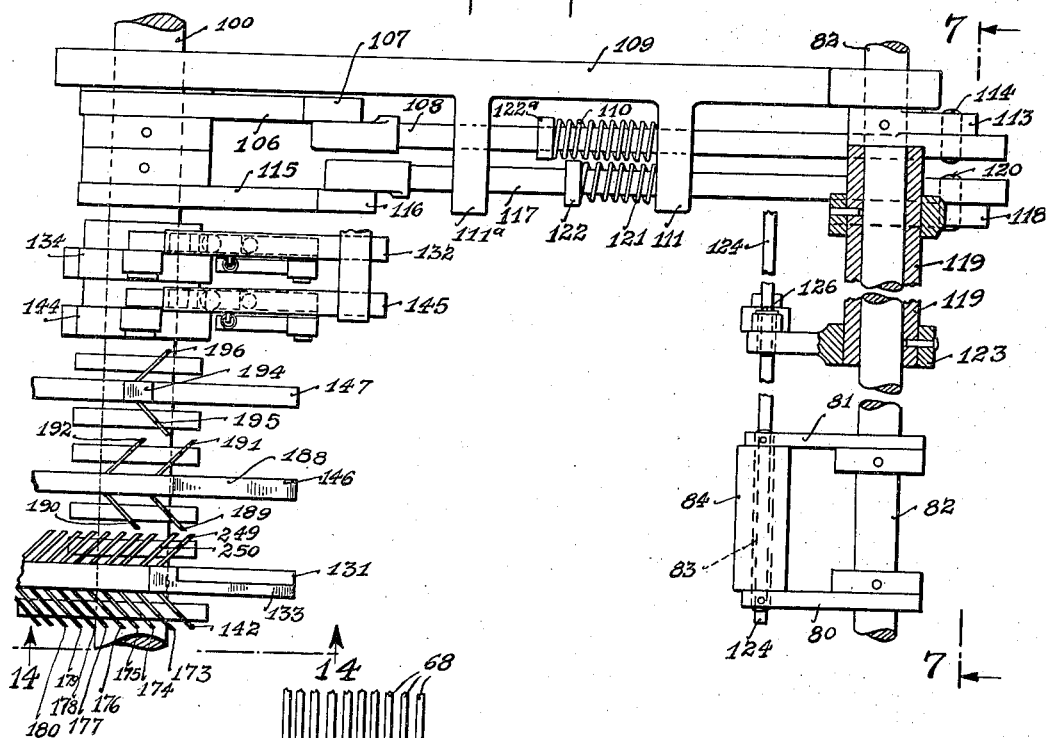
INVENTOR
LINCOLN M. KEEFE
BY
Van Doventer & Griet
ATTORNEYS

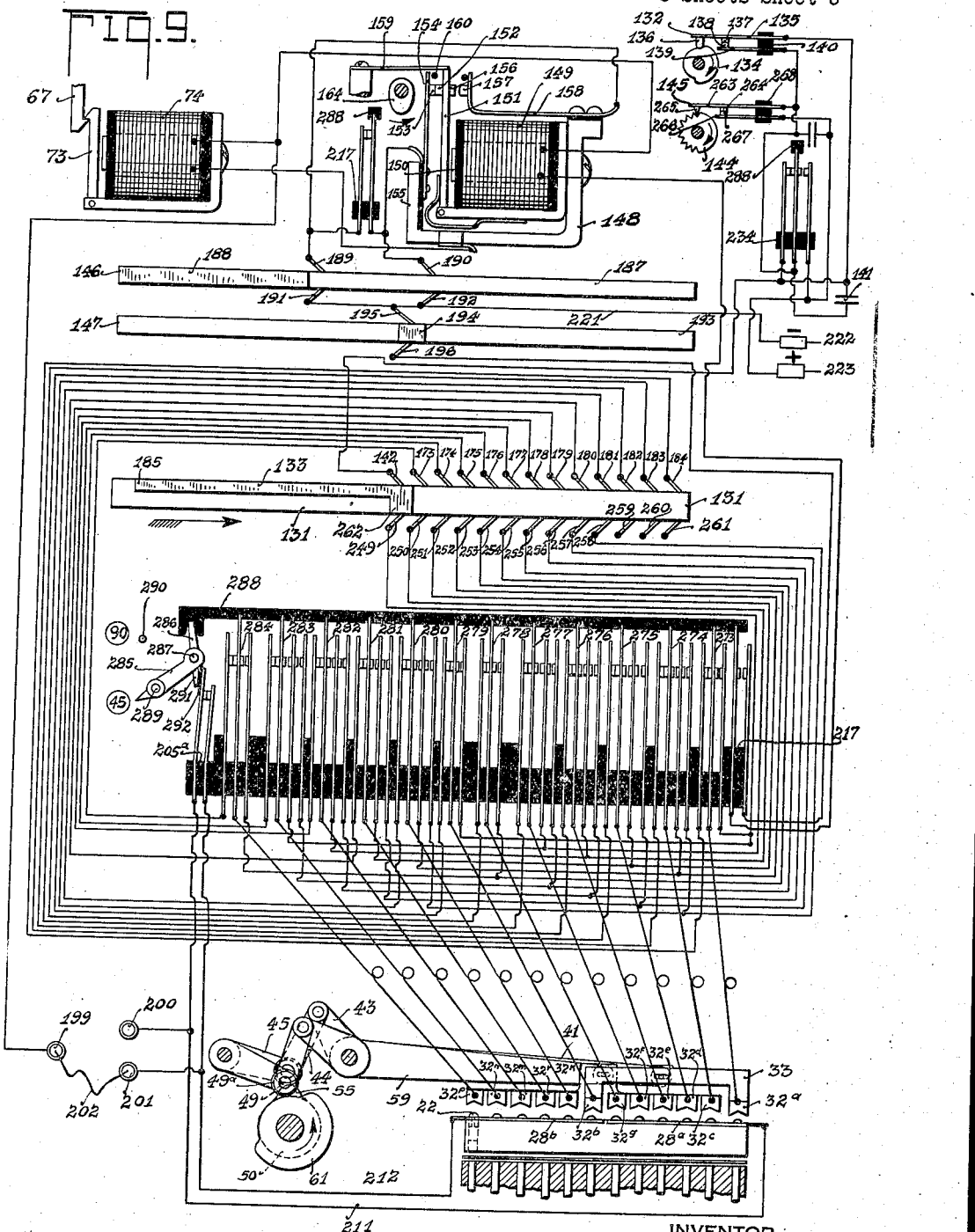

Oct. 25, 1938.  L. M. KEEFE  2,134,284
RECORD CONTROLLED MACHINE
Filed March 3, 1934  8 Sheets-Sheet 6
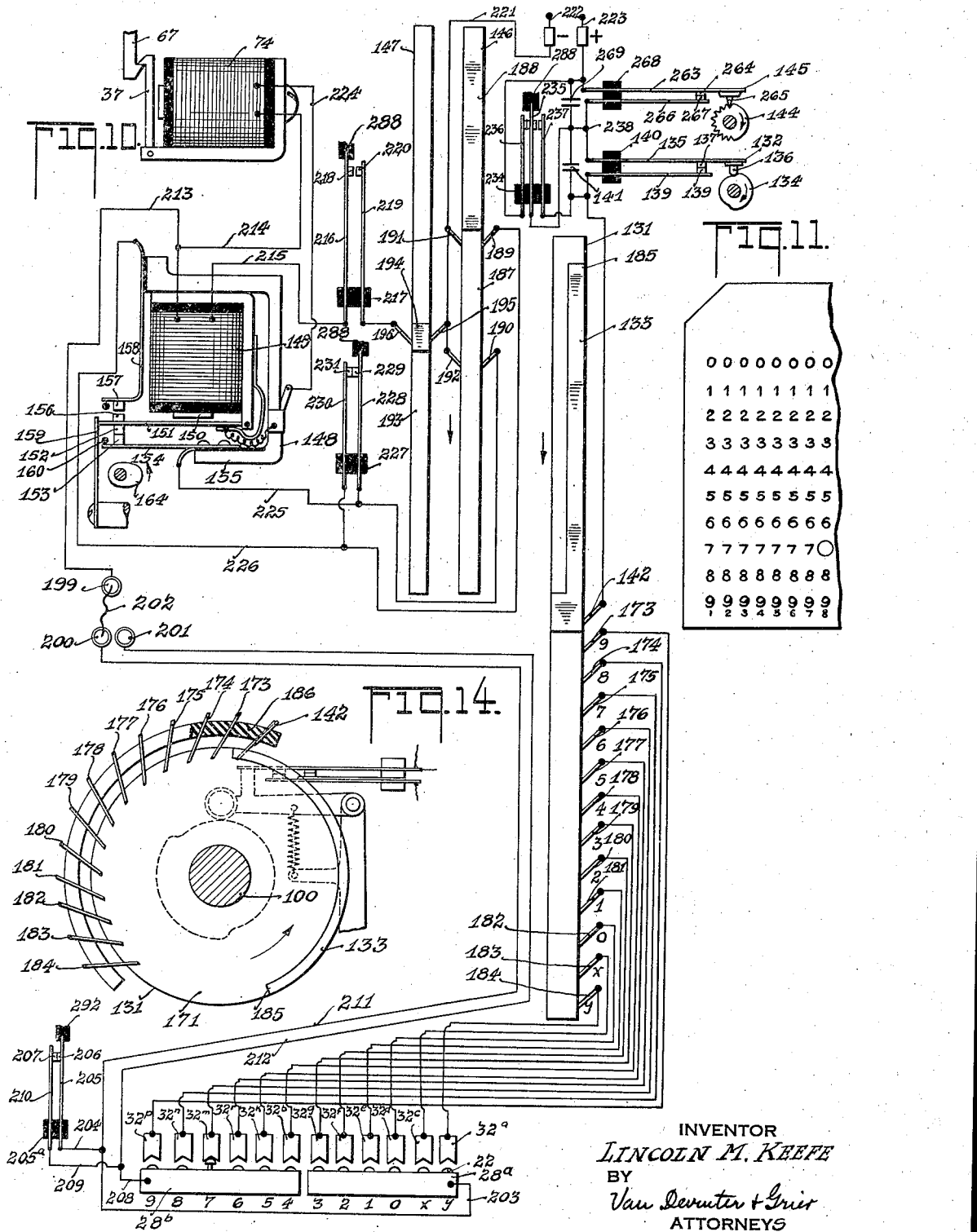

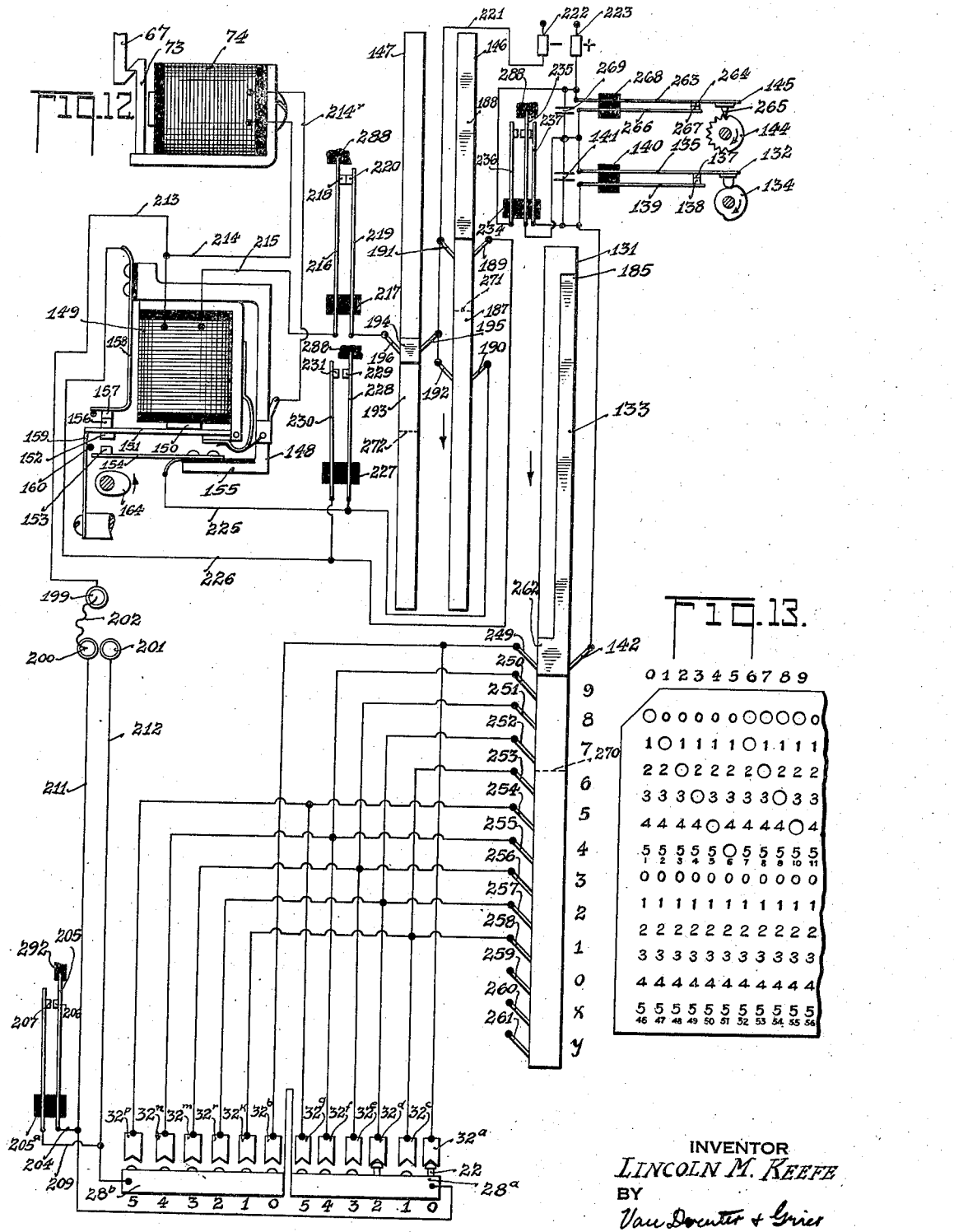

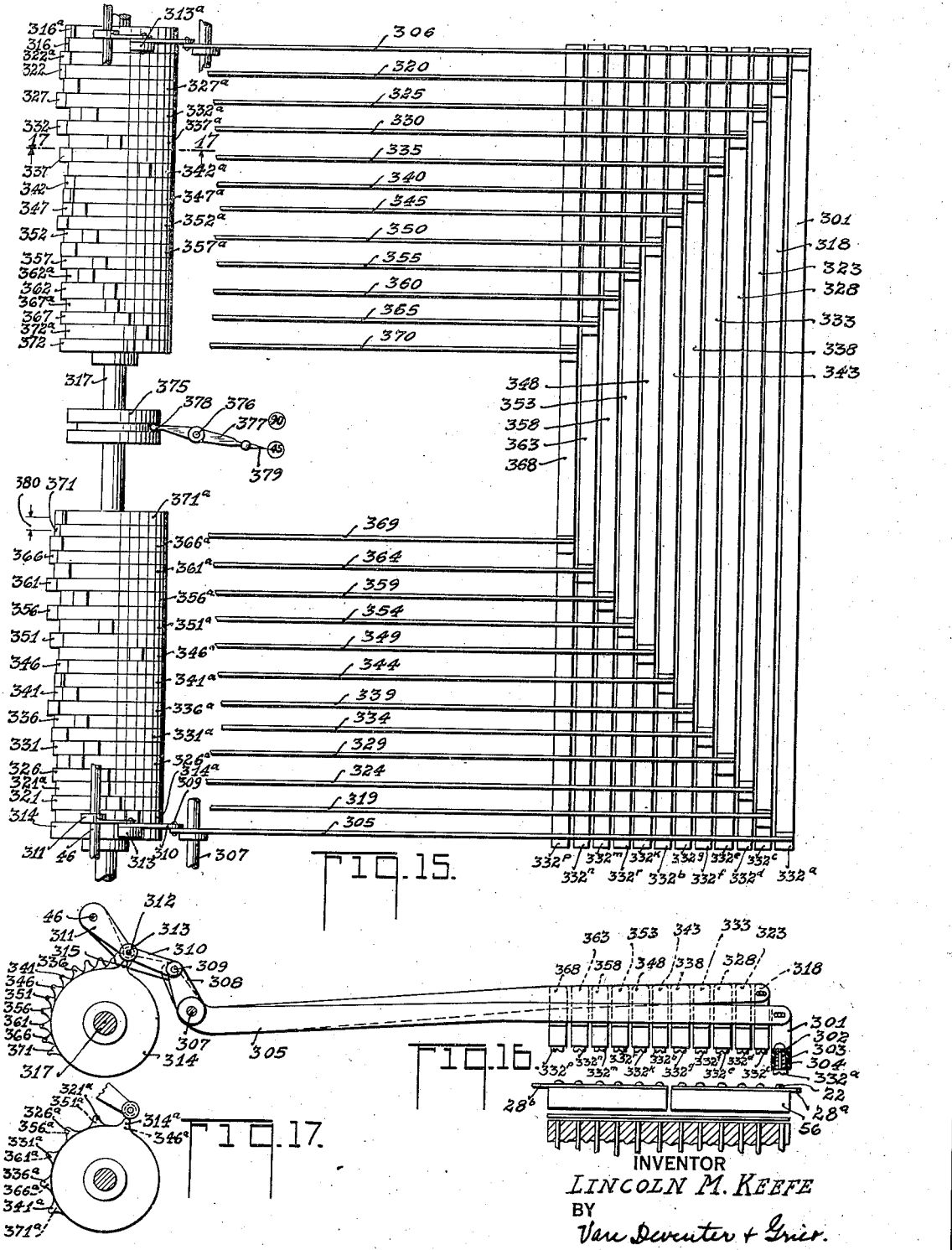

Patented Oct. 25, 1938

2,134,284

UNITED STATES PATENT OFFICE 2,134,284

RECORD CONTROLLED MACHINE

Lincoln M. Keefe, Springfield, Mass., assignor to Remington Rand Inc., Buffalo, N. Y., a corporation of Delaware Application March 3, 1934, Serial No. 713,868

21 Claims. (Cl. 235—61.9)

This invention relates to improvements in record controlled machines of the pin sensing type and is directed more particularly to translators for machines of this character. This new and improved translator, one embodiment of which is shown and described herein, is provided with a plurality of electrical paths adapted to be completed by the mechanical operation of the sensing pins of the machine and electrical impulses passing via these paths release moving interposers which control the functional and operative cycles of the machine, and is an improvement on the subject-matter described in my U. S. Patent No. 2,122,206, issued June 28, 1938.

Another object of the invention is the provision in mechanical tabulating machines of the pin sensing type of a translator which may be positioned between the sensing pins and the type bar actuators and operative controls of the machine adapted to be used with both the regular type of forty-five column record and the denominational type of record, such as that shown and described in Patent #1,780,621, issued November 4th, 1930, to W. W. Lasker, using the regular type of stop pin basket instead of the special one shown in the aforesaid patent to Lasker. When the regular type of forty-five column record is used, a lever on the translator is thrown to one extreme position and when the denominational type of record is used this lever is thrown to the opposite extreme position. When the lever is in the latter extreme position, control relays connected in circuit with the return wires of electro-magnetic releases associated with moving interposers in the translators disable or enable circuits in which these return wires are connected. This enabling and disabling is controlled by the denominational holes in the record. When the lever is thrown in the first-mentioned position for use with the regular type of record, these relays are disabled and the electro-magnetic releases are directly controlled by instrumentalities cooperating with the sensing pins of the tabulating machine.

A further object of the invention is the provision in a record controlled device in which the record cards are stationary while being sensed by the analyzing pins of the device, of a mechanical-electrical translator including a plurality of interposers one for each card column in the machine, each positioned adjacent to a row of stops for controlling the operation and functioning of the device, moving said interposers in timed relation to a definite portion of an operating cycle of the device, electrical releases associated with the interposers and adapted to be selectively connectable with an auxiliary sensing means cooperating with the sensing pins, means for energizing the auxiliary sensing means and the elements connected thereto successively in accordance with the horizontal rows and vertical columns of the index point positions on the cards, and electrical instrumentalities in circuit with the electrical releases and so arranged that they may be disabled to obtain one result or enabled for obtaining an entirely different result.

Another object of the invention is the provision in record controlled machines of the pin sensing type of a translator adapted to substitute electrical impulses having time, sequence and position values for the mechanical impulses having position values only.

A further object of the invention is the provision in a tabulating-printer of the pin sensing type in which the record cards are stationary while being sensed by a pin sensing means, of a translator having moving interposers adapted to be electrically released when selectively included in circuits with contact devices actuated by the pin sensing means, and including instrumentalities in the return wires of said electrical releases also adapted to be controlled by some of the pins of said sensing means for enabling or disabling said electrical releases when denominational records are used.

Another object of the invention is the provision of a translator having electrically released moving interposers and instrumentalities in the return wires of the electrical releases and a control lever therein adapted to be thrown into two extreme positions one of which includes the instrumentalities in circuits with the electrical releases and the other of which nullifies the action of said instrumentalities.

A further object of the invention is the provision in a translator having moving interposers adapted to be released electrically, of a plurality of contactors each of which is adapted to be actuated by a mechanical sensing pin in a record controlled device, and having contactors so arranged in groups that one group may be moved out of range of said sensing pins while the other is within the range of the pins and subsequently the group within range of the pins may be moved out of range therewith and said first group moved into range therewith.

Another object of the invention is the provision in a mechanical-electrical translator of a plurality of impulse distributors one of which is adapted to successively energize contactors corresponding to the vertical columns of index point positions of a record card, or successively energize and de-energize said contactors in accordance with the type of record used, the first being used for the conventional forty-five column type record and the latter for the so-called "ninety column", or denominational type record.

A further object of the invention is the provision in a mechanical-electrical tabulator of mechanism driven by said tabulator adapted to complete electrical paths therein, to distribute electrical impulses to said paths in accordance with the type of record used and to alternately shift groups of contactors into and out of range with sensing pins in said tabulator.

Another object of the invention is the provision in a record controlled accounting machine having record controlled sensing pins and including the conventional stop pin basket, of moving interposers and electrical releases therefor having instrumentalities in the return circuits thereof so arranged that when said instrumentalities operate, a different stop pin will be actuated by the interposer than the one corresponding to a given hole in the record card.

A still further object of the invention is the provision in a record controlled tabulator of a mechanical-electrical translator including mechanism adapted to be rotated by said tabulator, an auxiliary sensing means adapted to be actuated by the reciprocating action of the mechanical sensing pins in the tabulator, and moving interposers adapted to be oscillated by the tabulating machine and having electrical releases associated therewith including means for selectively connecting said releases to an auxiliary sensing means, and means under control of the records for disabling or delaying action of the electrical releases.

Other objects and advantages will appear from the specification and drawings in which are detailed the description of a specific embodiment of the new and improved translator shown in connection with a record controlled tabulator-printer of the mechanical type including a regular type stop pin basket.

An example of a tabulating machine with which the herein described embodiment of the invention is particularly adapted to be used is shown and described in Patent #1,245,504, to J. Powers, or Patent #1,730,513, to W. W. Lasker. These machines are generally known to the trade as "Powers" machines. They are also referred to as "mechanical tabulating machines", and consist of a card feeder, a group of sensing pins comprising generally a sensing pin for each index point position on the record card, and adding, printing and control elements. A translator is positioned between the sensing pins and the adding, printing and control elements. The record card is stationary while being sensed, and wherever each hole appears in a record card at the senser, a sensing pin rises and projects therethrough, and all of the sensing pins, where holes in the record appear, rise simultaneously and have position values only.

The existing translators consist of a removable casing having therein a plurality of push rods or wires. These push rods have their lower ends held in alignment with the sensing pins by means of suitable guides, and their upper ends in alignment with a series of stops which control the adding, printing and functional elements of the machine.

Wherever a sensing pin passes through a hole in the card it engages the lower end of a push rod in the translator, and in turn the upper end of the push wire raises the stop with which it cooperates, thereby, for example, controlling the position at which a type segment comes to rest, and others of these push rods in the translator, when engaged by a sensing pin, may control the operating or functional elements of the machine.

A good example of an existing translator is shown in Figures 4, 5 and 9 of the above mentioned Powers' patent. It is housed in a unitary, removable structure, and the push rods are arranged therein in accordance with the form of record card with which it is to be used.

Within certain limits, the push wires in the translator may be arranged to conform to a given card pattern, and push wires corresponding with sensing pins of a given index position in the card may terminate in an entirely different position in the upper face of the translator casing. In some cases, where one sensing pin is required to control two type segments the push wires may be made in the form of a Y, and it is customary to make these translators up at the factory in accordance with the card form to be used.

Heretofore, it has been customary for the user of such machines to have several translators, to cover several card forms which he uses or in case it is desired to obtain several arrangements of data from a single card form, and every time the machine is used for a different card form or setup the corresponding translator is placed in the machine when setting the same up for a given operation.

In existing "Powers" machines, the indicia on the record cards have position value only, and all sensing pins, where holes appear in any card, pass therethrough simultaneously.

In existing tabulating machines of this character designed for use in connection with standard record cards, the stop pins are arranged in groups and each unitary group is called in the trade a "stop pin basket". A sectional view of a standard stop pin basket is shown in Figure 2 of the drawings, in Patent #1,730,513, to W. W. Lasker, mentioned above, the stops being designated by the numeral 20, and each row containing ten stops corresponding to the index point positions of a vertical column of the record card.

Heretofore, a standard stop pin basket could not be used for anything but standard records, therefore, to use so-called "denominational" or increased capacity record cards, such as illustrated in Figure 6 of the drawings, in Patent #1,780,621, to W. W. Lasker, it was necessary to develop a special stop pin basket, such as is described in the last-mentioned patent, and illustrated therein in Figures 2, 3, 4 and 5.

A tabulating machine equipped with this special type of stop basket, which in this specification will hereafter be termed a "ninety column stop pin basket", has the distinct disadvantage in that when so equipped it can not handle the standard forty-five column type of record. Therefore, in many businesses where both types of records may be used it has been necessary to have separate machines for each type of record.

The present invention contemplates the provision of a universal translator which may be substituted for existing translators in machines of this character and thereby eliminates the necessity for exchanging translators when a different card form is used in the machine, and a machine equipped with standard stop pin baskets may be used with either the standard forty-five column records or the denominational, or increased capacity records.

Instead of having a push wire for every index point position of the card as the present translators have, the improved device uses a single moving interposer for each vertical column of the card. These interposers are moved or oscillated by a mechanical driver moving in timed relation to a specific portion of the operating cycle of the machine and each interposer is adapted to actuate any one of the stops in the row in which it operates, corresponding to the index positions "0" to "9" in any given column of the card.

By means of the moving interposers the indices on or in the cards not only have position values, but have time, and sequence values also, an improved feature which was heretofore impossible in machines of this character.

A plurality of sets of contacts are provided, one set cooperating with each of the sensing pins, so that when the sensing pins pass through holes which appear in the card, the set of contact elements cooperating therewith are closed. These contact elements terminate in a plurality of jacks in a plug board.

Electricity is supplied to these contacts by a suitable impulse distributor rotated in timed relation to the movement of the moving interposers in the following sequence; In any given row, and at any given instant when the interposer is in line with the type segment stop for a "9", the contacts cooperating with the "9" sensing pin are energized; when the interposer is in line with the "8" segment stop, the contacts cooperating with the "8" sensing pin are energized, and so on.

Each of the moving interposers has an electro-magnet, cooperating therewith, by means of which an interposer may become disengaged from the oscillator drive, allowing the same to move in a plane angular with respect to its original motion, whereupon it is engaged by a suitable guide and caused to actuate a type-segment control stop. Connections to these electro-magnets also terminate in a plug board and by means of plug wires any one of the interposer control magnets may be connected to the contact cooperating with any given sensing pin, making the use of the device unlimited as to the number of card forms with which it may be used, and both standard forty-five column records and ninety column records may be used in a tabulating machine associated with this device.

Each electro-magnet, which may be termed an "electrical" or a "magnetic" release, has associated therewith a relay. This relay is adapted to disable or enable the circuit containing its associated magnetic release, thereby causing the electrical release to operate when a second impulse is received when using combinational hole records. When using standard records, this relay is disabled, and the electrical releases are controlled directly by the contactors actuated by the sensing pins. Other actions of the relays associated with the electrical releases will be presently described.

The construction and operation of an embodiment of the new and improved translator will be described in connection with a "Powers" type machine, such as that shown and described in the aforesaid patent, #1,730,513, to W. W. Lasker.

Referring to the drawings:

Figure 2 is a cross-sectional view of the improved translator constituting one embodiment of the invention and showing details of its construction;

Figure 3 is an enlarged view of the upper part of Figure 1, showing the operation of the printing mechanism of the machine and the relation of the improved translator thereto;

Figure 4 is a fragmentary, sectional view in cross-section of a portion of the contactor element, showing how the same is operated by a sensing pin passing through a punched hole in a record card;

Figure 5 is a sectional view of one of the contactors shown in Figure 4, showing details of construction of the same and showing how it contacts with its cooperating member;

Figure 6 is a plan view partly in section showing the relative positions of the cams on the main drive shaft of the machine for oscillating the interposers and resetting the same, and showing the relative positions of the impulse distributors and the interrupters;

Figure 7 is an elevation of the oscillating and resetting mechanisms as viewed along the line 7—7 of Figure 6 and showing the position of the oscillating arm relative to the interposers moved thereby;

Figure 8 is a cross-sectional view of the resetting bar as viewed along the line 8—8 of Figure 7;

Figure 1:
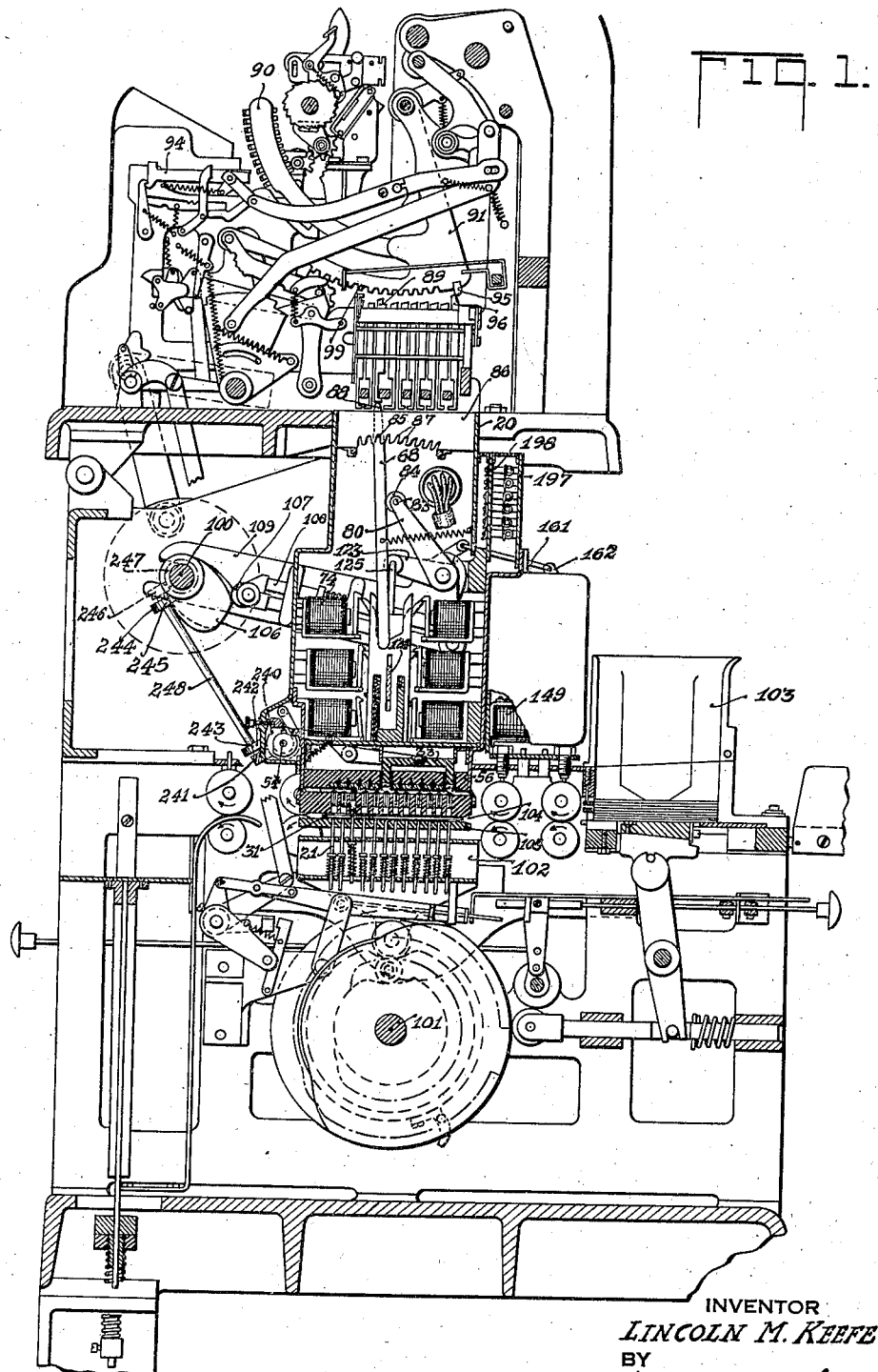
Figure 1 is a front-to-rear vertical, sectional view of a tabulator of the "Powers" type, showing one embodiment of the new and improved translator positioned between the sensing pins and the stop pin basket thereof.

Figure 9 is a diagrammatic sketch showing the contact elements, the impulse distributors, the interrupters, one control release, a relay adapted to control the functioning of the release, a multiple switch, and the electrical connections between all of these elements. The electrical switch is provided with two normal positions, one for use with standard records and the other for use with denominational records;

Figure 10 is a diagrammatic sketch showing the circuits in the device when the switch is in position for use with standard records;

Figure 11 is a view of a portion of a standard record showing a hole punched in the "7" index position in one of the vertical columns thereof;

Figure 12 is a diagrammatic sketch showing the circuits in the device when the switch is in position for use with ninety-column or "denominational" types of records;

Figure 13 is a view of a portion of a combinational record which may be called a "ninety-column" record;

Figure 14 is an end view of the impulse distributor shaft as viewed along the line 14—14 of Figure 6;

Figure 15 shows a plan view of a modified arrangement of the cooperating contact members in which each row of these members is successively moved into and out of the zone of the pin actuated moving contact members;

Figure 16 is an end elevation of the modified arrangement shown in Figure 15; and Figure 17 is an elevation showing the positions of the cams utilized when operating the device shown in Figure 15 with 90 column records.

As the operation of the card feeding device, the sensing pins, and the adding and printing elements of the Powers type of tabulating machine are well-known to those skilled in the art the operation of these elements need not be described in detail. Therefore, the description will be confined to the operation of those parts of the tabulator as they cooperate and coact with the elements of the new and improved translator.

The translator is housed in a unitary casing, generally designated by the numeral 20, and a plurality of movable contact members 22 are positioned at the bottom of the casing 20 in line with the sensing pins 21 of the tabulating machine. These movable contact members 22 are assembled in a plurality of rows in a block of insulation 23, with each movable contact member in line with a sensing pin, so that there are as many movable contact members as there are sensing pins in the machine.

In the embodiment shown in the drawings each one of the movable contact members 22 consists of a metallic rod 24 having an enlarged head 25, and having the end opposite the head straight knurled, the knurled portion being indicated by the numeral 26. The block of insulation 23 has a hole 27 drilled therein. This hole is open at its lower end to admit the ends of the sensing pins 21 and is closed on its upper end by a metallic strip 28, having a clearance hole for the rod 24 substantially concentric with the hole 27.

In assembling the contact element 22 the rod 24 is dropped into the hole in the metallic strip 28, a spring 29 is dropped in via the hole 27 and the rod of insulation 30 having a hole therein is pressed upon the straight knurled portion 26 of the rod 24. The contact element 22 operates as follows: when a sensing pin 21 rises, due to the presence of a hole in the record 31, it engages the rod of insulation 30 and presses the same upward against the tension of the spring 29, and the rod 24 moving therewith is adapted to make contact with cooperating contact members 32, which will presently be described.

The movable contact members are in the embodiment shown arranged in forty-five rows corresponding to a forty-five column record, and twelve of these contacts are arranged in each row. Each row of twelve contacts is connected in common via the metallic strip 28 when used with a forty-five column record, but in order that the tabulating machine may be used for both forty-five and ninety column records, the metallic strip 28 is split in the center, making each row consist of two groups of six movable contact members. The two halves of the metallic strip 28, designated as 28$^a$ and 28$^b$, are each connected to a jack which will presently be described, so that either group of six contactors may be selectively connected to other operative elements of the device. The halves 28$^a$ and 28$^b$ are also electrically connected to a switch by means of which when it is desired to use the machine for forty-five column records the two groups of six movable contactors may be connected in common. Details of the connections to the switch and to the jack will be presently described.

The cooperating contact members 32 are secured to suitable insulating supports. Each of these members is adapted to cooperate with all of the movable contact members 22 in a row corresponding with the horizontal row of index point positions in the record card. Therefore, longitudinally, these members are positioned at right angles to the metallic strips 28 above described.

The cooperating contact members 32$^a$ and 32$^b$, which correspond to the two "0" positions on the ninety column record, such as is shown in Figure 13, are secured to a square yoke 33. The square yoke 33 has a slot 34 provided therein at substantially the midpoint thereof, and a partition 35, in the casing 20, serves as a support for the angle strips 36 and 37. These strips serve as guides for the yoke 33 and cooperate with the sides 38 and 39 thereof, so that the yoke 33 may be reciprocated.

In devices of the kind described, where a large number of electrical circuits are involved, it is impossible for an impulse to pass into a circuit or circuits other than the one which it is intended for. The term "flowback" may be taken to mean "current branching and flowing into circuits in which it is not wanted instead of only flowing in wanted circuits." This is particularly true of circuits involved in utilizing the device for operation with 90 column records.

In using ninety column records, to prevent flowback in some of the circuits, it is preferable to have the cooperating contact members 32$^a$ and 32$^b$ moved out of contact with their movable contact members during a certain portion of the operating cycle of the tabulating machine. This is accomplished as follows: a bell-crank 40, pivoted on the shaft 40$^a$, has an arm 41 thereof carrying a pin 42, which is positioned in the slot 34 of the yoke 33. The other lever 43 of the bell-crank 40 has a link 44 connected thereto and this link is connected to a second link 45, the opposite end of which is pivoted on the pivot shaft 46 in the stationary boss 47. A pivot pin 48 connecting the links 44 and 45 carries a roller 49 adapted to be actuated by the cam 50, and a spring 51 is connected to the pivot 52 which connects the arm 43 with the link 44, and to the frame 20 at 53, tending to pull the lever 43 downward, and the roller 49 in contact with the cam 50. When the cam 50 revolves with the shaft 54, the roller 49 is in contact therewith and the yoke 33 carrying the contact members 32$^a$ and 32$^b$ remains raised until the roller 49 is engaged by the lobe 55 of the cam 50, at which time the roller 49 will be raised thereby and the motion imparted to the arm 43 of the bell-crank will cause the same to move in a clockwise direction, as viewed in Figure 2, and at the same time the lever 41 moving therewith will, via the pin 42, move the yoke downward so that the movable contact members 22 may make contact therewith. The leverages of the arms and links and the lobe of the cam are so proportioned that when the yoke 33 is in its lowest position the contact members 32$^a$ and 32$^b$ are within contact range of the movable contact members 22.

Similarly, the other ten cooperative contact members are secured to a movable block of insulation 56, which is provided with bosses, one of which is shown at 57, having slots 58 therein, and in order that the block 56 may also be reciprocated a similar bell-crank is positioned on the shaft 40$^a$ behind the bell-crank 40, as viewed in Figure 2, and one arm thereof is shown at 59 carrying a pin 60 which operates in the slot 58 of the boss 57. The arrangement of the linkage, the roller and the spring are similar to the arrangement described in connection with the bell-crank 40, the roller being positioned in front of the roller 49 and adapted to be operated by the cam 61.

It will be noted that the cam 61 has a high portion which is substantially longer than the lobe 55 on the cam 50, therefore, the block 56 will be held down in cooperative relation to the movable contact members 22 during a greater portion of the operating cycle of the tabulating machine than the yoke 33, thereby giving time for the impulse distributors, which will presently be described, to operate.

When it is desired to operate the tabulating machine with forty-five column records, all of the contact members 32 and the contact members 32ª and 32ᵇ may be brought into line with each other and in cooperative relation to the movable members 22, by bringing the rollers out of engagement with the cams 50 and 61. One means of doing this is shown in Figure 2.

The shoulder screw 63 in the wall of the cam housing 62 may be screwed in, thereby pushing the block 64 forward on the slide 65 and thereby engaging the links 45 and forcing the same against the tension of the spring 51 until the rollers are out of engagement with the cams 50 and 61. The shoulder 66 may be provided to act as a stop, in which case the screw 63 may be screwed in as far as it will go, whereupon the shoulder 66 would engage the casing 62 and prevent the screw from being turned any further.

The method of driving the cams 50 and 61 will be presently described.

All of the stationary contact members 32, including the members 32ª and 32ᵇ, are each connected to a multi-contact switch so that for use with forty-five column records one kind of impulse distributor may be used in connection therewith, and for use with ninety column combinational records a different type of impulse distributor may be used in connection therewith. The method of connecting these members with the impulse distributors will be presently described.

The new and improved translator is provided with a plurality of slide plates 67. Each of these slide plates has pivoted or hinged therein a movable arm 68. The slide plates 67 are also provided with slots 69 and 70 by means of which they may reciprocate upon the U-shaped frame member 71. The frame member 71 carries a plurality of springs 72, each tending to force a slide plate 67 upward.

Normally, the slide plates are held in their lowest positions by the armatures 73 of the electro-magnets 74. Each armature has a projection 75 which engages a cooperating projection 76, which forms an integral part of the slide plate 67.

To conserve space, the electro-magnets 74 are arranged in tiers and the projections 76 of the slide plates 67 are so positioned that they each engage a projection 75 of the armature 73 of one of the electro-magnets 74.

Each of these electro-magnets has associated therewith a relay which when ninety column records are used determines the portion of the operating cycle of the machine in which the same shall operate. When forty-five column records are used this relay is disabled. These relays and their method of operation in effecting control of the moving arms 68 will presently be described.

Each one of the movable arms 68 has a spring 77 secured thereto and secured to the casing 20 at the point indicated by the numeral 78 in any suitable manner. These springs tend to pull the arms 68 to the right as viewed in Figure 2 and hold them normally against the bumper 79.

A plurality of supports 80 and 81 are carried by an oscillating shaft 82 and support a roller shaft 83 which in turn carries a roller 84. This roller is free to turn on the shaft 83 and as the shaft 82 rocks counter-clockwise, as viewed in Figure 2, the roller 84 bears against the arms 68 and propels them to the left. When the shaft 82 has moved the roller 84 the fullest length of its stroke to the left, it begins moving to the right and the arms 68, due to the tension of the springs 77, follow the roller 84 on its return stroke and continue to follow the same until they engage the bumper 79, unless previously released. The arms 68 each have a stud 85 near the outer ends thereof, the function of which will be presently described.

Between each of the moving arms 68 there is provided a rack plate 86 having a plurality of notches 87 formed therein and adapted to be engaged by the studs 85, which may be termed "locating studs", and the notches 87 in the rack plate 86 may be termed "guide slots". The locating studs and the guide slots cooperate in the following manner: When the arms 68, moved by the roller 84, are oscillated in timed relation to the operating cycle of the machine, and one of the magnets 74 is energized, the armature 73 is attracted to the core of the magnet 74 and the projecting portion 75 thereof becomes disengaged from the projecting portion 76 of the slide plate 67. Due to the action of the spring 72 the slide plate is immediately propelled upward, as viewed in Figure 2, and the locating stud 85 engages the guide slot 87 beneath which it was positioned at the instant at which the magnet 74 was energized. The oscillating motion of the released arm 68 is arrested due to the engagement of the locating stud with the guide slot, and the spring 72 propels the released sliding plate and arm 68 until the stop pin 85 traverses the full length of the slot 87, and in so doing the outer end 88 of the arm 68 engages and pushes up one of the type sector stops 89 of the tabulating machine.

The arms 68 which have not been so released follow the roller 84 until they are engaged and stopped by the bumper 79. It must be borne in mind that this description applies when the machine is used with standard forty-five column records. Where ninety column records are used, the magnets 74, instead of being directly under control of the records are directly under control of relays which in turn are directly under control of the records. The action of this relay and the method of controlling the magnets 74 will presently be described.

The type sectors 90 are movable with the actuators 91 to bring the desired type 92 to printing position, the type 92 being driven against a work sheet carried by a platen and paper carriage, indicated generally at 93, by suitable hammer devices 94. The actuators 91 carry stop lugs 95 normally held against forward movement by stops 96 on movable shutters 97. When one of the shutters 97 is operated during an operating cycle of the machine to swing its stop 96 out of the path of the respective stop lug 95, then the respective actuator 91 is permitted to move to the left. The extent of this movement is determined by the type sector stop 89, and as illustrated in the drawings, the stop 89 corresponding to a "7" index point position in the card being raised, the stop lug 95 of the actuator 91 will engage the type sector stop 89 and stop in such a position that the type sector 90 will stop with the type 92 in line with the hammer 94, so that when the latter operates a "7" will be printed.

The accumulator gears 98 are adapted to be thrown into or out of mesh with the racks 99 carried by the actuators 91. This engagement or disengagement always takes place either when the racks have completed their movement in one direction or the other, or when they are at rest in normal position. The time of such engagement or disengagement is opposite for total-printing to what it is for item-printing. A dwell is therefore made at each of these points to ensure the correct meshing of the pinions with the racks. As this is well-known in the art it is not here described in detail.

A shaft, indicated by the numeral 100, rotates once for each card cycle of the machine. A shaft 101, which may be termed the "main drive shaft" of the machine, also makes one revolution for each card cycle of the machine. This shaft effects the reciprocation of the sensing pin box 102 and the shafts 100 and 101 run in synchronism to effect the various functions of the machine in proper time or sequence.

In normal operation, the record cards 31 are fed from a magazine 103 into the card throat, generally designated by the numeral 104, and formed between the insulating block 23 and the sensing pin guide plate 105. In Figure 1, a record card 31 is shown in the throat 104. This record is stationary while being sensed, and the pin box 102 is shown in its extreme upper or raised position, and it will be noted that one of the sensing pins 21 extends through a hole in the record, and is pressed against the insulating block 30 of the movable contact 22, causing the same to make contact with the cooperating stationary contact 32.

A cam 106, secured to the shaft 100, which may be termed an "oscillating arm cam", has cooperating therewith a roller 107. This roller is supported in cooperative relation with the cam 106 by a push rod 108. This push rod is suitably supported in bearings in the stationary member 109, which also serves as a distancer between the shaft 100 and the shaft 82. The roller 107 is normally held against the cam 106 by a spring 110 acting between the bearing 111 and a collar 122ª, which is fixed to the push rod 108.

The shaft 100 is an integral part of the tabulating machine, and the shaft 82 is an integral part of the new and improved translator. The shaft 82 is suitably supported in the casing 20 by bearings, one of which is indicated by the numeral 112.

The push rod 108 is connected to a crank arm 113 by a suitable pivot pin 114, and the crank arm 113 is keyed or otherwise fixed on the shaft 82. When the shaft 100 is rotated, the cam 106, via the roller 107, moves the push rod 108 with a reciprocating motion and this motion is imparted to the shaft 82 via the pin 114, and the crank arm 113, causing the shaft 82 to oscillate in timed relation to the operation of the tabulating machine. The roller 84, carried by the supports 80 and 81, which are secured to the shaft 82, engaging the movable arms or interposers 68, imparts an oscillatory motion to said arms, causing them to move from left to right and return during one card cycle of the machine, which is during one revolution of the shafts 100 and 101.

A reset cam 115 is also secured to the shaft 100 and has a roller 116 cooperating therewith. This roller is rotatably supported on a push rod 117.

A crank arm 118 is keyed or otherwise secured to a sleeve shaft 119, which may be termed a "reset shaft". This sleeve shaft 119 surrounds and is journaled upon a portion of the length of the shaft 82.

The crank arm 118 is connected by a suitable pivot pin 120 to the push rod 117. A spring 121, acting between the bearing 111 and a collar 122 secured to the push rod 117, keeps the roller 116 in contact with the cam 115.

A crank arm 123 is keyed or otherwise secured to the reset shaft 119 and serves to actuate the reset bar 124. The linkage between the crank arm 123 and the reset bar 124 consists of a push rod 125, having one end thereof secured to the crank arm 123 by a pivot pin 126, and the other end thereof is made in the form of a yoke 127, having a socket 128 formed therein. A round shaft 129 is secured to the reset bar 124, or this may be a solid steel ball located in a hole in the reset bar 124, or it may be formed of two members riveted thereto in the form of a ball.

During the reset cycle of the machine, the cam 115, via the roller 116, pushes the push rod 117 and imparts motion to the shaft via the pivot pin 120 and the crank arm 118. The motion of the shaft 119 is passed on to the reset bar 124 via the crank arm 123, the pivot pin 126, the push rod 125 and its yoke 127, to the shaft 129, thereby moving the reset bar downward, as viewed in Figures 1, 2 and 7. The reset bar 124 is adapted to be reciprocated in the rectangular slots 130 which are formed preferably on the center line in the slide plates 67.

During the normal operating cycle of the machine the reset bar 124 is normally held near the upper ends of the rectangular slots 130 in the slide plates 67, but during the reset cycle the motion of the shaft 119, due to the action of the cam 115 above described, is imparted to the reset bar 124, causing the same to move downward in the slot 130. During this movement the reset bar 124 reaches the bottom of the slot 130 and carries down all of the slide plates 67 which have been actuated, whereupon the slide plate projections 76 are engaged by the projections 75 on the armatures 73. These slide plates are held in their lower position against the tension of the springs 72 until such time as any of the magnets 74 actuate the armatures 73 for releasing any of the slide plates 67.

The crank arm 123 has formed integral therewith a second arm 123ª, which is adapted to reset a plurality of control relays adapted to control the functioning of the release magnets 74. The resetting of these relays and the resetting of the slide plates 67 are accomplished at the same time, by the movement of the arm 123, together with the extension 123ª. The method of resetting the relays will be presently described.

Having described the mechanical operation of the device (and the straight operation described is more particularly adaptable to the use of forty-five column record cards) the method of supplying electrical impulses thereto in timed relation to a portion of the working cycle of the tabulating machine will now be described.

The record is stationary while being sensed and when the old type of translator is used in which the motion of a sensing pin is imparted to the type segment setting bar by a push wire, the index point positions on the card have position values only.

In the new and improved translator, although the record is stationary while being sensed, the method of setting up and distributing electrical impulses gives the index point positions in the cards not only position value but also time and sequence values. This is accomplished by distributing electrical impulses to the contactor devices cooperating with the sensing means, which may be termed "a secondary sensing means" or "an auxiliary sensing means", during a definite portion of the operating cycle of the machine.

The shaft 100 has secured thereto an impulse distributor 131 and a breaker 132. The impulse distributor 131 is shown in Figures 9, 10 and 12, as having its circumference spread out in a straight line so that the relation of a live segment 133 therein may be followed as it cooperates with a plurality of brushes which are connected to different parts of the device, and which will later be described more in detail.

The breaker, designated generally by the numeral 132, consists of a cam 134, a lever 135 carrying a bumper 136 cooperating with the cam 134 and carrying a contact point 137, which is adapted to make contact with a contact point 138 carried by a stationary arm 139. The moving arm 135 and the stationary arm 139 are supported by suitable insulation 140, and it is sometimes preferable to shunt a condenser 141 across the two arms to reduce sparking at the points 137 and 138 to a minimum.

As the cam 134 and the impulse distributor 131 are on the same shaft, 100, they operate in definite timed relation to each other, and in the position shown in Figure 10 the cam rotating clockwise has just allowed the moving arm 135, through the medium of the bumper 136, to move down and allow its contact point 137 to make contact with the stationary contact point 138, at the same time the segment 133 of the impulse distributor has made contact with the brush 142, and the cam 134 allows the breaker 132 to supply current to the brush 142 up to a point just before the trailing end of the segment 133 is about to leave the brush 142, whereupon the cam opens the contact points 137 and 138 so that sparking, if any, will occur at the contact points, instead of at the brushes.

The shaft 100 also carries a cam 144, which has a breaker 145 associated therewith and two additional impulse distributors 146 and 147, the functions of which will be presently described.

Each of the magnet coils 74 has associated therewith a relay, designated generally by the numeral 148. This relay has an actuating coil 149 on the core 150. An armature 151 carries a contact point 152, which is adapted to cooperate with a contact point 153, carried by the stationary arm 154. The stationary arm 154 is insulatedly supported on the frame member 155, and normally the armature 151 is positioned with its contact 152 in contact with the contact point 153.

The armature 151 also carries a contact point 156, adapted to cooperate with a contact point 157, carried by a second stationary arm 158, which is insulatedly supported on the other end of the frame member 155. When current is sent through the actuating coil 149 the core 150 is energized and magnetically attracts the armature 151, breaking contact between the contact points 152 and 153, and establishing contact between the contacts 156 and 157, and at the same time the armature lock 159 moves to the right, as viewed in Figure 10, until stopped by the pin 160, thereby holding the armature 151 with its contact 156 in contact with the contact point 157.

During the resetting cycle, the extension 123a of the crank arm 123 imparts its motion via the connecting rod 161 to the lever 162, the shaft 163, and the cam 164. The motion of the cam 164 in the direction of the arrow, referring to Figure 2, pushes the push rod 165 downward against the spring 166, and the projecting pin 167 in turn engages and pushes the armature lock 159 downward, thereby releasing the armature 151 and allowing it to return to its normal position, with the contact points 152 and 153 in contact. The push rod 165 may be provided with suitable bearings 168 and 169 in the relay housing 170, which may also form an integral part of the casing 20.

The impulse distributor 131 consists of a rotor 171, secured to the shaft 100, and having a metallic insert or segment 133, an end elevation of which is shown in Figure 14. In the diagrammatic sketches, Figures 9, 10, and 12, this impulse distributor, as well as the impulse distributors 146 and 147, is shown with the entire circumference stretched out straight. Of course, it must be understood that the diagrams of the impulse distributors are so laid out that the circuits may more easily be traced, but in reality the rotors are circular and preferably of similar diameter to the rotor 171, shown in Figure 14.

In addition to the brush 142 cooperating with the metallic segment 133, a plurality of brushes 173 to 184, inclusive, are adapted to cooperate with the segment 133. These brushes are energized by the segment 133, which is fed by the brush 142 in the following order: The brush 173 is first energized, followed by 174, 175, 176, etc., and when the trailing end 185 of the segment 133 moves out of contact with the brush 142 (the breaker 132 having broken the circuit immediately previous) all of the brushes 173 to 184, inclusive, are deenergized.

When the device is used for forty-five column records by suitable switching means, which will presently be described, the brush 173 is connected to the cooperating contact member 32p, corresponding to the horizontal "9" row on the record, the brush 174 is connected to the cooperating contact member 32n corresponding to the horizontal "8" row on the record, etc., the brush 182 being connected to the cooperating contact 32d corresponding to the horizontal "0" row in the record, and the brushes 183 and 184 being connected to the contactors corresponding to the "X" and "Y" horizontal rows in the record respectively.

The brushes 142 and 173 to 184, inclusive, are supported in operative relation to the rotor 171 by a suitable insulating support 186. These brushes contact the rotor 171 on one face near the periphery thereof. The opposite face of the rotor 171, near the periphery thereof, is provided with another set of brushes, which will presently be described.

The impulse distributor 146 consists of an insulated rotor 187 having a metallic insert 188 and stationary brushes 189, 190, 191 and 192, cooperating therewith. The brushes 189 and 191 are preferably positioned so that they contact the segment 188 simultaneously, and the brushes 190 and 192 are positioned in the same manner.

The distributor 147 consists of an insulated rotor 193, having a metallic insert 194 and brushes 195 and 196 cooperating therewith, these two brushes being so positioned that they contact the segment 194 simultaneously.

The casing 20 is provided with a suitable insulated panel 197, having a supporting panel 198 spaced apart therefrom and secured to the casing 20 in any suitable manner. A plurality of jacks 199, 200, 201, are supported by the panels 197 and 198 and plug wires 202 may be used for interconnecting these jacks. The connections of the jacks to the circuits of the device will be presently described.

The two halves 28ª and 28ᵇ of the metallic strip 28 forming part of the auxiliary sensing means and carrying the movable contact members 22, should be connected together when the device is used for forty-five column records, and should be disconnected when the device is used for ninety column records. To facilitate in doing this, the half 28ª is connected via the wire 203 and the branch 204 to a movable arm 205 of switch 205ª. This movable arm carries a contact point 206. The other half, 28ᵇ, is connected via the wire 208 and the branch 209 to a stationary arm 210 carrying a contact point 207. The contact points 206 and 207 are positioned on the members 205 and 210 so that they are adapted to contact each other. When the arm 205 is moved to the left, as viewed in Figure 10, the contact points 206 and 207 make contact and connect 28ª and 28ᵇ together. When the arm 205 is moved to the right, contact between the points 206 and 207 is broken and 28ª and 28ᵇ are disconnected from each other.

The wire 211 forms an extension to the wire 203 and is connected to a jack 200, and likewise, the wire 212 forms an extension to the wire 208 and is connected to a jack 201 so that when the arm 205 is moved to the right, disconnecting 28ᵇ from 28ª, the operator may plug into the jack 200 and thereby connect 28ª to any other jack in the plugboard, or by plugging into the jack 201, connect 28ᵇ to any other jack in the plugboard, or when the arm 205 is thrown to the left, connecting 28ª and 28ᵇ, the jacks 200 and 201 are at the same time connected in common, in which case either the jack 200 or the jack 201 may be used with the same result.

In the embodiment shown, forty-five of the switches 205ª are provided.

The jack 199 is connected via the wire 213 to one side of the actuating coil 149 of the relay 148, and by means of a jumper 214, to one end of the winding of a release magnet 74. The other end of the winding of the actuating coil 149 is connected by means of the wire 215 to a movable arm 216 of the switch 217, which carries a contact point 218. A stationary arm 219 carries a contact point 220 adapted to cooperate with the contact point 218, and the stationary arm is in turn connected to the brush 196 which forms a part of the impulse distributor 147. The other brush, 195, of the impulse distributor 147, and the brushes 191 and 192 of the impulse distributor 146, are connected in common and to the negative side 222 of a source of current, by means of a wire 221.

The other end of the winding of the magnet 74 is connected by means of a wire 224, which may be termed a "return wire", to the armature 151 of the control relay 148. The stationary arm 154 of the relay 148 is connected via a wire 225 to the brush 190 of the impulse distributor 146, and the stationary arm 156 of the relay 148 is connected by means of the wire 226 to the brush 189 of the impulse distributor 146. A switch 227 has its movable arm 228 carrying a contact point 229 connected to the wire 225, and its stationary arm 230 is connected to the wire 226 and the contact point 231 carried thereby is adapted to cooperate with the contact point 229.

When the device is used for forty-five column records, the relay 148 is disabled by opening the contacts 218 and 220 of the switch 217, and by closing the contact points 229 and 231 of the switch 227, thereby opening the circuit of the actuating coil 149 and connecting together the stationary arms 154 and 156 of the relay, so that the return wire 224 of the release magnet 74 is connected via the arm 151, the contacts 152, 153, the arm 154, and the wire 225, to the brush 190, and at the same time via the switch 227 to the brush 189.

The relay 148 is completely disabled and the device operates the same as if the relay were not present, and the action may be traced as follows: When the impulse distributor 131 moves in the direction of the arrow to the point where its segment 133 contacts the brush 173, the segment 188, of the impulse distributor 146 has moved forward in the direction of the arrow, connecting the brushes 189 and 191 to the negative side 222 of the line. Therefore, current can flow from 222 via the wire 221 to the brush 191, via the segment 188 to the brush 189, and via the wire 226, the switch 227, the wire 225, to the stationary arm 154, and via the contacts 153, 152, the armature 151 and the wire 224 to the magnetic release 74 and via the wires 214 and 213, and the jacks 199 and 200 to the group of movable contact members 22, but as the brush 173, corresponding to the "9" row in the record card, has not had its corresponding cooperating member 32 in contact with a movable member 22 no current can flow.

The same is the case when the impulse distributors move forward and contact with the brush 174, corresponding to the "8" row. However, when the brush 175, corresponding to the "7" is reached by the segment 133, a movable contact 22 has been raised by a sensing pin and is in contact with the cooperating contact member 32ᵐ, corresponding to the "7" row. Therefore, current can and does flow through the magnetic release winding 74, and as the movable interposer arms 68 are oscillated in timed relation to the movement of the shaft 100 and also to that of the impulse distributors, the slide 67 is released by the magnet 74, the spring 72 propels the plate 67 upward, the stud 85 is engaged by the notch 87 immediately above, and the end 88 of the arm 68 sets the stop pin 89 so that when the slide 97 releases the member 91 the type segment will stop with a "7" in printing position. When the hammer 94 is released, a "7" is printed on the paper carried by the platen 93.

As pointed out above, the breaker 132 closes just after the brush 142 makes contact with the segment 133 and opens just before the brush 142 leaves the trailing end 185 of the segment 133.

The breakers 132 and 145 are connected in series between the brush 142 and the positive side 223 of the source of current, and switch 234 is provided for shorting either of these breakers out of the circuit.

The switch 234 has a movable arm 235 with contact points therein adapted to make contact with the arm 236 when thrown in one direction, and the arm 237 when thrown in the opposite direction. The arm 235 is connected to the midpoint 238 between the breakers 132 and 145, the arm 236 is connected between the breaker 145 and the positive terminal 223 of the source of current supply, and the arm 237 is connected between the breaker 132 and the brush 142, so that when the movable arm 235 is thrown to the left, as shown in Figure 10, the breaker 145 is short-circuited, and will have no effect upon the circuit, leaving the breaker 132 to control the circuit. When the device is used for ninety column records, the breaker 132 is short-circuited by throwing the arm 235 to the right, leaving the breaker 145 controlling the circuit. This will be hereinafter more fully explained in detail.

An example of a forty-five column record is shown in Figure 11, with the "7" index point position punched in the "8" column. The sensing pins, shown in Figures 1 and 2, would therefore correspond to the "8" column of the record.

Referring to Figures 1 and 2, the shaft 54 is provided with a gear 240, and a spiral gear 241 meshes therewith. The gears 240 and 241 are held in operative relation by a casting 242, which is supported on the shaft 54 and provides a bearing 243 for the gear 241. A similar casting 244 is supported on the shaft 100, and a bearing 245 is provided therein for the spiral gear 246, and a gear 247 is keyed to the shaft 100 and adapted to drive the gear 246.

A shaft 248 is splined to the gears 246 and 241 so that when the shaft 100 rotates, the gear 247 thereon drives the gear 246 and rotates the shaft 248. The gear 241, rotated by the shaft 248, drives the gear 240, and the shaft 54, to which it is keyed, also rotates. The gears 240, 241, 246 and 247 are so proportioned that when the shaft 100 makes a complete revolution, the shaft 54 synchronously makes a complete revolution.

An example of a combinational record is shown in Figure 13, and for the sake of illustration, a code is punched therein in columns 1 to 10. From this record, it will be noted that the index point positions from "0" to "5" are punched as single holes in "0" to "5" index point positions, and the digits "6" to "9", inclusive, are combinations of two holes in the record. For example, the "6" is a combination of the "0" and the "1" index point positions, the "7" is a combination of the "0" and the "2" index point positions, etc.

When using the device for ninety column records, referring to Figure 2, the thumb screw 63 is unscrewed, thereby allowing the block 64 to move to the left and allowing the rollers 49 and 49ᵃ to come into operative relation with the cams 50 and 61 on the shaft 54, in order that the group of cooperative contacts 32 and the contacts 32ᵃ and 32ᵇ may be reciprocated, as above described, to prevent flowback in some of the circuits.

In using the device for ninety column records, the connections between the cooperating contacts 32 and the impulse distributor 131 are entirely different, and the relays 148, controlling the release magnets 74, must be so connected that they control the release magnets 74, and the two edges 28ᵃ and 28ᵇ of the connector strip 28 must be isolated and the breaker 145 must be used instead of the breaker 132, therefore, the breaker 145 must be enabled and the breaker 132 must be disabled.

The diagrammatic sketch, Figure 9, shows how these changes may be effected by merely throwing a lever. This figure will presently be described, but in order to more clearly describe the operation in connection with ninety column records, the description is confined for the present to Figure 12.

In order to more clearly describe the connections, the cooperating contact members 32 are designated as 32ᵃ, 32ᵇ, 32ᶜ, etc. The brush 142 is used but the brushes 173 to 184, however, are not used in connection with ninety column records, therefore, they are not shown in the diagram Figure 12. Instead of the brushes not shown, a plurality of brushes 249 to 261 are shown contacting with the opposite face of the impulse distributor 131. The metallic segment 133 is so formed that it contacts with the brush 249 and after leaving the same contacts with the brush 250, etc. Therefore, the segment 133 is provided with a narrow face 262 to accomplish this.

The brush 249 is connected to both the contact member 32ᵃ and the contact member 32ᵇ which correspond to the "0" index point positions in columns 8 and 53 of the record card. The brush 250 is connected to both the contact members 32ᶠ and 32ⁿ and also to the brush 255. The brush 251 is connected to the contact members 32ᵉ and 32ᵐ and also to the brush 256. The brush 252 is connected to the contact members 32ᵈ and 32ʳ and also to the brush 257. The brush 253 is connected to the contact members 32ᶜ and 32ᵏ and also to the brush 258. The brush 254 is connected to the contact members 32ᵍ and 32ᵖ. The brushes 259, 260 and 261 are not shown connected to anything and are provided so that impulses having time corresponding to the positions of the brushes may be available for other purposes.

The interrupter 145 consists of a moving arm 263 carrying a contact 264 and provided with a bumper 265 adapted to engage the cam 144. A stationary member 266 carries a contact point 267 adapted to cooperate with the contact point 264 and suitable insulation 268 is provided to support the arms 263 and 266 in this cooperative relation.

The cam 144 is provided with lobes corresponding in number to the brushes 249 to 258 used, and these are so arranged that when any of the brushes 249 to 258 make contact with the face 262 of the segment 133, no current is flowing, and after contact has been established the contacts 264 and 267 are closed by the cam and again opened thereby just before the brush reaches the trailing edge of the face 262 of the sector so that no sparking will occur at the brushes. The sparking, if any, will occur at the contact points 264 and 267 and a condenser 269 is provided to reduce the sparking at the contact points 264 and 267 to a minimum.

The switch 205ᵃ has its contact points 206 and 207 open so that 28ᵃ and 28ᵇ are disconnected from each other. The plug wire 202 is shown connecting the jack 199 to the jack 200, allowing the operator to utilize the movable contact members in the group 28ᵃ, corresponding to the upper half of the record, shown in Figure 3.

The switch 227 is shown with its contact points 229 and 231 open, so that the relay 148 can control the operation of the magnetic release magnet 74.

The switch 217 is shown with its contact points 218 and 220 closed, thereby connecting the return wire 215 of the actuating coil 149 of the control relay 148 to the brush 196 of the impulse distributor 147.

The switch 234 is shown with its movable arm 235 thrown to the right, thereby short-circuiting the breaker 132 and allowing the breaker 145 to control the circuit.

The operation of the device in connection with a ninety column record will now be described. On the ninety column record, shown in Figure 13, it will be noted that in the eighth column both a "0" index point position and a "2" index point position are punched, and according to the card herein taken for an example the holes punched in the "8" column correspond to a "7" and when this card is passed through the sensing means, sensing pins 21 will pass through these holes and push the movable contact members 22, corresponding to the "0" and the "2" positions, into contact with the cooperating contact members 32ª and 32ᵈ.

The metallic segment 133, with its extension 262 forming part of the impulse distributor 131, after the sensing pins have acted first connects the brush 142 to the brush 249 whereupon the breaker 145, through the action of the cam 144, has its contact points 264 and 267 closed and current will flow from the positive terminal 223 of the source of current via the breaker 145 to the brush 142, via the segment 262 to the brush 249. The contact member 32ª receives current from the brush 249 and as the movable contact in the group 28ª, corresponding to the "0" index point position, is in contact with 32ª, current will flow from 32ª to 28ª, and thence via the wire 211 to the jack 200.

Before tracing the passage of current from the jack 200, it is here pointed out that the contact members 32ª and 32ᵇ, supported by the yoke member 33, are in cooperative relation to the movable contact members 22 during the first portion of the card cycle, and the block 56 carrying the other ten contact members 32 is at the same time held out of the range of the movable contact members 22 to prevent flowback. As soon as the machine and the impulse distributors pass the "0" portion of the card cycle, at which time the brush 249 contacts the segment 262, the yoke 33, carrying the contact members 32ª and 32ᵇ, is immediately raised and at the same time the block 56, containing the rest of the contact members 32, is lowered into cooperative relation to the movable contact members 22. Therefore, at the time that current is supplied to 28ª, via the "0" movable contact member 22, the "2" movable contact is not in contact with 32ᵈ.

Resuming the description of the passage of current through the circuit, current passes from the jack 200 via the plug wire 202 to the jack 199, and thence from the jack 199 via the wire 213 current flows to the winding 149 of the relay 148, and from the other side of this winding via the wire 215 and the switch jack 217 to the brush 196 of the impulse distributor 147, and since the segment 149 thereof is at this time connecting the brushes 196 and 195 together, current flows therefrom via the wire 221 to the negative terminal 222 of the source of current.

The relay 148 normally has its armature 151 with contact 152 engaging the contact 153 on the stationary arm 154, but the current passing through the winding 149 energizes the core 150 and attracts the armature 151, thereby pulling the contacts 152 and 153 apart and establishing contact between the contact points 156 and 157. As soon as the armature 151 is attracted by the core 150, the locking arm 159 moves over against the pin 160 and holds the armature in position with the contacts 156 and 157 engaged. They are held in this relation until the reset cam 164 disengages the holding arm 159 from the armature 151, so that the armature 151 can return to normal when the machine is resetting at the finish of a card cycle.

When the current was passing via the wire 213 to the winding 149 of the relay 148, current could also have passed via the winding of the release magnet 74, if the return circuit of this winding had not been disabled.

The winding of the release magnet 74 is connected to the wire 213 by a wire 214, and the return wire thereof is connected via a wire 214ʳ to the armature 151. As the normal position of the armature 151 is with its contacts 152 and 153 together, current could flow via the wire 214ʳ, and the armature 151, via the contacts to the stationary arm 154, and thence via the wire 225 to the brush 190 of the impulse distributor 146, but as the metallic segment is not in contact with the brush 190, current cannot get across to the brush 192 and to the negative terminal 222.

However, due to the actuation of the relay 148 by the impulse above described, and the establishment of the contact between contact points 156 and 157, the return wire 214ʳ is connected to the brush 189. This circuit may be traced as follows: from the wire 214ʳ to the armature 151 via the contacts 156 and 157 to the stationary arm 158, and thence via the wire 226 to the brush 189 of the impulse distributor 146, but as the metallic segment of this distributor has not connected the brushes 189 and 191 together, current cannot flow therebetween.

As soon as the breaker 145 opens (at the end of the "0" portion of the current cycle) the yoke 33 carrying the contact members 32ª and 32ᵇ rises so that there is no contact between 32ª and the movable contact 22, and at the same time the block 56 carrying all of the other contact members 32, moves down in cooperative relation to the movable contact members 22, as previously described.

The impulse distributors move forward and the segment 262 of the impulse distributor 131 next makes contact with the brush 250 and at the same time the segment 194 of the impulse distributor 147 moves forward and out of contact with the brushes 195 and 196, and the segment of the impulse distributor 146 moves forward, connecting the brushes 189 and 191 together. As soon as contact is established between the brushes 250 and the segment 262, the breaker 145 closes, but since no movable contact 22 is contacting 32ᶠ, no current flows to the jack 200 via the strip 28ª and the wire 211.

The same obtains when the impulse distributor moves forward until its segment 262 contacts the brush 251, because there is no contact between a movable member 22 and a cooperating member 32ᶠ.

When the impulse distributors have advanced until the segment 262 of the impulse distributor 131 contacts the brush 252, and the breaker 145 closes, current does flow due to the fact that a movable contact member contacts the member 32ᵈ. At this instant, the leading end of the segment 133 of the distributor 131 is at the position indicated by the dotted line 270, the leading edge of the segment 188 of the distributor 146 has advanced to the point indicated by the dotted line 271, and the segment 194 of the impulse distributor 147 has advanced to the point indicated by the dotted line 272. The flow of current may be traced as follows: from the positive terminal 223 via the breaker 145 to the brush 142, and via the segment to the brush 252, thence to the contact member 32ᵈ and via the movable contact member and the wire 211 to the jack 200, and via the plug wire 202 and the jack 199, and the wires 213 and 214 to the release magnet 74, thence via the wire 214ʳ, the armature 151, the contact points 156 and 157 and the arm 158, and thence via the wire 226 to the brush 189, and since segment 188 connects the brush 189 to the brush 191, current can thereby flow from the brush 189 to the brush 191 and via the wire 221 to the negative terminal 222. Since the return wire 215 of the coil 149 in the relay 148 is disabled, due to the fact that the segment 194 has disconnected the brushes 195 and 196, the relay 148 is unaffected.

The current flowing through the release magnet 74 attracts the armature 73 and releases the slide plate 67, thereby allowing the moving arm 68 to move upward, where its boss 85 is engaged by a notch 87 in the rack plate 86, and the end 88 of the arm 68 engages and sets the stop pin 89, as shown in Figure 2, so that the type bar actuator 91 will stop the type bar with a "7" in printing position.

It will be noted, as pointed out above, that the moving arms 68 are moved in timed relation to the shaft 100 of the tabulating machine, and since the impulse distributors are also in timed relation to the shaft 100, the arm 68 at the time it was released was immediately below the stop pin 89, corresponding to the "7" position.

This is accomplished by means of a "0" and a "2" index point positions, which in the code selected above corresponds to a "7", using the old type stop pin basket, which was originally designed for use with standard forty-five column records only.

At the end of the cycle, as previously described, while the tabulating machine is resetting, the setting bar 124 is actuated, thereby resetting all of the slide plates 67 and at the same time the cam 164 acting against the rod 165 resets all of the locking arms 159 of the relays. It has been pointed out that the connections when the device is to be used with forty-five column records, as shown in the diagrammatic sketch, Figure 10, are in many respects different from the connections when ninety column, or combinational records are used, as shown in Figure 12.

For convenience in rapidly effecting the proper connections for either type of record, the circuits are arranged as shown in Figure 9.

A plurality of switches, which will presently be described, have the movable arms thereof connected to an insulating strip 288, which may be shifted to one extreme position for the use of forty-five column records, and to the other extreme position for use with ninety column records. A lever 285, pivoted on a shaft 287 has an arm 286 integral therewith and engaging the insulating strip 288. The arm 285 may also be provided with an extension 291 having the face thereof provided with insulation 292 and engaging the switch 205ª. When the lever 285 is thrown downward, as shown in Figure 9, for use with forty-five column records, the spring pin 289 engages a hole (not shown) and locks the lever 285 in this position. When the lever 285 is thrown upward to the ninety column position, the spring pin 289 engages the hole 290, and retains it in position for ninety column records.

For simplicity, and in order not to have too many numerals appear on the drawings, the switches will be described as viewed in Figure 9. The long movable arm connected to the strip 288 and operated thereby will be called the "operating arm", and the cooperating arms of the switch will be called the "left arm", the "right arm", or the "right intermediate arm". Where the intermediate arms appear, the operating arm contacts both the right intermediate arm and the right arm, when thrown to the right. All of these arms carry suitable contact points adapted to cooperate with each other.

The switch 217 is provided for connecting or disconnecting the coil 149 of the relay 148 to the brush 196 of the impulse distributor 147, as described above.

The switches 273 and 279 each consist of an operating arm and right and left cooperating arms. The operating arm of the switch 273 is connected to the contact member 32ª and its left arm is connected to the brush 184 of the impulse distributor 131. The right arm of this switch 273 is connected to the brush 249 and also to the right arm of the switch 279. The operating arm of the switch 279 is connected to the contact member 32ᵇ, and the left arm of the switch 279 is connected to the brush 178. Therefore, when these switches are thrown to the right for ninety column operation, the contact member 32ª is disconnected from the brush 184 and the contact member 32ᵇ is disconnected from the brush 178 and these contact members 32ª and 32ᵇ are connected together and to the brush 249. This may be checked by referring to Figure 12.

The switch 274 consists of an operating arm, a left arm, a right intermediate arm and a right arm. The operating arm is connected to the contact member 32ᶜ. The left arm is connected to the brush 183 and in the position shown in the drawings this connection is effected. The right intermediate arm is connected to the brush 253 and to the right intermediate arm of a switch 280. The right arm of the switch 274 is connected to the brush 258 and is also connected to the right arm of the switch 280, and the operating arm of the switch 280 is connected to the contact member 32ᵏ. The left arm of the switch 280 is connected to the brush 177. Thus, when the operating arms are thrown to the right, the contact member 32ᶜ is disconnected from the brush 183 and the contact member 32ᵏ is disconnected from the brush 177, and the contact members 32ᶜ and 32ᵏ are connected together and to the brushes 253 and 258.

The switches 275 and 281 each have an operating arm, a left arm, a right intermediate arm, and a right arm.

The switch 275 has its operating arm connected to the contact member 32ᵈ. The left arm of this switch is connected to the brush 182. The right intermediate arm of the switch 275 is connected to the brush 252 and to the right intermediate arm of the switch 281, and the right arm of the switch 275 is connected to the brush 257 and to the right arm of the switch 281. The operating arm of the switch 281 is connected to the contact member 32ʳ, and the left arm of the switch 281 is connected to the brush 176.

When the operating arms of the switches 275 and 281 are thrown from left to right the contact member 32ᵈ is disconnected from the brush 182, at the same time the contact member 32ʳ is disconnected from the brush 176, and these contact members 32ᵈ and 32ʳ are connected together and also to the brushes 252 and 257.

The switches 276 and 282 each have an operating arm, a left arm, a right intermediate arm, and a right arm.

The operating arm of the switch 276 is connected to the contact member 32ᵉ. The left arm of this switch is connected to the brush 181. Its right intermediate arm is connected to the brush 251 and to the right intermediate arm of the switch 282. The right arm of the switch 276 is connected to the brush 256 and to the right arm of the switch 282. The operating arm of the switch 282 is connected to the contact member 32ᵐ, and the left arm of this switch is connected to the brush 175.

When the operating arms of switches 276 and 282 are thrown from left to right the contact member 32$^e$ is disconnected from the brush 181, at the same time the contact member 32$^m$ is disconnected from the brush 175, and at the same time these contact members 32$^e$ and 32$^m$ are connected together and to the brushes 251 and 256.

The switches 277 and 283 each have an operating arm, a left arm, a right intermediate arm and a right arm.

The operating arm of the switch 277 is connected to the contact member 32$^f$. The left arm of this switch is connected to the brush 180. Its right intermediate arm is connected to the brush 250 and to the right intermediate arm of the switch 283. The right arm of the switch 277 is connected to the brush 255 and to the right arm of the switch 283. The operating arm of the switch 283 is connected to the contact member 32$^n$, and the left arm of this switch is connected to the brush 174.

When the operating arms of the switches 277 and 283 are thrown from left to right the contact member 32$^f$ is disconnected from the brush 180, at the same time the contact member 32$^n$ is disconnected from the brush 174, and at the same time these contact members 32$^f$ and 32$^n$ are connected together and to the brushes 250 and 255.

The switches 278 and 284 each have an operating arm, a left arm, and a right arm.

The operating arm of the switch 278 is connected to the contact member 32$^g$. The left arm is connected to the brush 179. The right arm of the switch 278 is connected to the brush 254 and to the right arm of the switch 284. The operating arm of the switch 284 is connected to the contact member 32$^p$, and the left arm of the switch 284 to the brush 173.

When the operating arms of the switches 278 and 284 are thrown from left to right the contact member 32$^g$ is disconnected from the brush 179, the contact member 32$^p$ is disconnected from the brush 173, and these contact members are connected together and to the brush 254.

All of the above named switches and the switches 217, 227 and 234 have their operating arms connected together by the insulating strip 288, so that the movement of said strip will operate all of the switches simultaneously. When the arm 285 is thrown down for forty-five column operation, the switches are all moved by the strip 288, and the connections are in effect substantially those shown in Figure 10 which are suitable for forty-five column operation.

When the lever 285 is thrown upward for ninety column operation, the insulating strip moves the operating arms of all of the switches and effectively sets up substantially the connections shown in Figure 12, and the device is ready for ninety column operation.

In the embodiment of the invention described above, the cooperating contacts 32$^a$ and 32$^b$ are described as jointly movable relative to all the other cooperating contact members and when these contact members 32$^a$ and 32$^b$ are moved into the zone of the movable contact members 22 which are actuated by the sensing pins 21 of the tabulating machine and when the cooperating contact members 32$^a$ and 32$^b$ are in this relation to the movable contacts 22 all of the other cooperating contact members are raised out of the zone of the movable contacts 22 so that they cannot be contacted by the members 22 and cause feed-back through other circuits in the device to give erroneous results.

In the modification shown in Figs. 15 and 16 the cooperating contact members are arranged in independent rows (corresponding to the horizontal rows in the record) and each row is moved into and out of the zone of the movable contact members 22 making sure that every row leaving the zone of the movable contacts 22 is out of the range of these contacts before the succeeding row is moved into the zone of the contacts 22.

It has also been found advantageous to resiliently mount each of the cooperating contact members upon its support. This takes care of irregularities and ensures good contact between each of the cooperating contact members and its movable contact 22.

Referring to Figs. 15 and 16, which show two cams adapted to cooperate with each roller 313, when a forty-five column record is used, the cams as will presently be described are arranged to successively lower bars carrying the cooperating contact members into the range of the movable contact members 22.

The shaft 317 carrying the cams is shiftable longitudinally, so that either one of two cams may be selected to actuate a roller 313. The shaft 317 carries a grooved collar 375. A pivoted arm 377 supported on a suitable pivot 376 has one end 378 engaging the grooved collar 375. The other end of the arm 377 is formed into a pointer 379 which may be set for forty-five or ninety column records. When positioned for forty-five column records, as shown in Fig. 15, the row of cooperating contacts 332$^a$ corresponds to the horizontal "Y" row in the record and in the embodiment shown forty-five of these cooperating contacts are used corresponding to the forty-five vertical columns in the record; the second row of cooperating contacts 332$^c$ corresponds to the horizontal "x" row in the records; the third row of cooperating contacts 332$^d$ corresponds to the horizontal "0" row in the records; 332$^e$ corresponds to the horizontal "1" row in the records; the row of cooperating contacts 332$^f$ corresponds to the horizontal "2" row in the records; the row 332$^g$ corresponds to the horizontal "3" row in the records; 332$^h$ corresponds to the horizontal "4" row in the records; 332$^k$ corresponds to the horizontal "5" row in the records; 332$^r$ corresponds to the "6" row in the records; 332$^m$ corresponds to the "7" row in the records; 332$^n$ corresponds to the "8" row; and 332$^p$ corresponds to the "9" row in the records.

The cooperating contacts 332$^a$ are resiliently supported on the bar 301 in the following manner. The contact 332$^a$ has secured thereto a shank 302 having a head formed on the upper end.

The insulation 303 has a hollow formed therein and contains a helical spring 304. This spring presses the cooperating contact member 332$^a$ downward and its movement downward is limited by the head formed on the shank 302. When the cooperating contact 332$^a$ is positioned within the zone of the moving contact 22 and a hole appears in the card immediately below, a sensing pin 21 passes through the hole in the card and pushes the moving contact 22 upward and into contact with the member 332$^a$, slightly raising the member 332$^a$ against the tension of the spring 304. Each of the cooperating contact members is so mounted to ensure perfect contact between the members 332 and the members 22.

The bar 301 carrying the forty-five cooperating contact members 332$^a$ is supported by bell cranks 305 and 306. The bell cranks 305 and 306 are supported on a pivot shaft 307. The arm 308 carries a pin 309 which connects it to the link 310. A second link 311 is pivoted on the pivot shaft 46 and is connected to the link 310 by a stud shaft 312. This stud shaft also carries a roller 313 so arranged that when the lobe 315 of the cam 314 engages the roller 313 the latter is raised, tending to bring the links 310 and 311 into a straight line, thereby swinging bell crank 305 downward and bringing the cooperating contact members 332ª within the zone of the moving contacts 22. A bell crank 306 is linked up in the same manner and the cam 316 is so positioned on the shaft 317 that the bell cranks 305 and 306 are operated simultaneously, thereby ensuring that the member 301 is always parallel to the block 56 supporting the movable contact members 22.

The cooperating contacts 332ᶜ are resiliently mounted on a bar 318 in the same manner that the cooperating contacts 332ª are mounted on the bar 301. The bar 318 has associated therewith bell cranks partly shown at 319 and 320. These bell cranks are supported on the shaft 307 and have the same kind of linkage between the shaft 307 and the shaft 346 as those described in connection with the bell crank 305, and the cams 321 and 322 move the bar 318 up and down in the same manner as described for the bar 301, except that the timing of the cams 321 and 322 relative to the cams 314 and 316 is so arranged that the cooperating contacts 332ᶜ carried by the bar 318 are brought within the zone of the moving contacts 22 immediately after the cooperating contacts 332ª are out of range of the moving contacts 22, thereby removing all possibility of impulses flowing in the wrong circuits and causing erroneous results. The bar 323 carries the cooperating contacts 332ᵈ and is supported and actuated in a like manner by bell cranks 324 and 325, and is moved by the cams 326 and 327. A bar 328 carries the cooperating contacts 332ᵉ and is supported and actuated by the bell cranks 329 and 330 through the cooperation with the cams 331 and 332. A bar 333 supports the cooperating contacts 332ᶠ and is supported and actuated on the bell cranks 334 and 335 and the cams 336 and 337 through suitable linkage and the bell cranks 334 and 335 move the bar 333.

The cooperating contacts 332ᵍ, 332ʰ, 332ᵏ, 332ʳ, 332ᵐ, 332ⁿ, and 332ᵖ are respectively carried by the bars 338, 343, 348, 353, 358, 363 and 368. These bars are supported by similar bell cranks and linkages and are actuated by the cams similar in form but timed to successively bring the bars and the cooperating contacts carried thereby into and out of the range of the moving contacts 22. These cams are in pairs respectively as follows: 341, 342; 346, 347; 351, 352; 356, 357; 361, 362; 366, 367; and 371, 372.

When using forty-five column records, the cooperating contacts are successively lowered into and out of the range of the moving contacts 22 in the following order: first, the cooperating contacts 332ᵖ, followed by 332ⁿ, 332ᵐ, 332ʳ, 332ᵏ, 332ʰ, 332ᵍ, 332ᶠ, 332ᵉ, 332ᵈ, 332ᶜ and 332ª are moved into and out of the zone of the contacts 22; each row of these contacts moves out of the zone of the contacts 22 before the succeeding row is moved into the zone of the contacts 22. At the same time, and in time with this movement, the segment 133 successively contacts the brushes 173, 174, 175, etc. After each successive contact is made an electrical impulse through the action of the cam 144 is impressed upon the circuits so established and if the jack 199 is plugged to a jack connected to the moving contact 22 this impulse may pass to the magnet 74 to release the slide plate 67. The cam 144 of the breaker 145 is so timed that the contacts of the breaker are opened immediately before each cooperating contact leaves the zone of the contacts 22, so that sparking due to the breaking of the circuit will occur on the contact points 264 and 267 of the breaker 145, thereby preventing pitting of the contacts 22 and the cooperating contacts 332, as well as the brushes of the impulse distributor 131.

The movement of the arm 68 is also in time with the movement of the arms carrying the cooperating contacts 332, so that when the arm 368 carrying the cooperating contacts 332ᵖ is within the zone of the contacts 22 the boss 85 carried by the arm 68 is immediately below the notch 87ª in the plate 86 (Fig. 2) corresponding to the "9" index point position, where a forty-five column record is used, so that if a hole appears in the record in this position, contact is established between the cooperating contact 332ᵖ and a moving contact 22 in the "9" position and when an impulse is instituted by the breaker 145, the release magnet is actuated, releasing the slide plate 67 and allowing the arm 68 to raise, whereupon the boss 85 will engage the notch 87ª and the end 88 of the arm 68 will raise and set a stop in the stop pin basket and allow the type carrier 90 to swing to a point where a "9" will be printed.

In Fig. 16, an end view of the shaft 317 is shown, depicting the positions of the cams used in connection with forty-five column records. These cams are 314, 321, 326, etc., the cams 314ª, 321ª, 326ª, etc., having been omitted from this view for the sake of clarity. The last-named cams which are used in connection with ninety column records are arranged on the shaft 317 in a different timing order from those used in connection with forty-five column records, as will presently be described.

For use with ninety column cards, the cooperating contacts 332ª and 332ᵇ correspond to the "0" positions on the record, due to the layout of the ninety column record, a portion of which is shown in Fig. 13. Likewise, the other cooperating contact members should also be actuated in pairs simultaneously. For example, after the pair 332ª, 332ᵇ is lowered into the zone of the contact members 22 and raised out of this zone, the pair of cooperating contact groups 332ᶜ and 332ᵏ corresponding to the one index point position in the ninety column record should go through the same procedure followed by the pair of contact members 332ᵉ, 332ʳ, etc. To accomplish this, a second set of cams 314ª, 316ª, 321ª, 322ª, etc., is provided adjacent to the cams 314, 316, etc. When the arm 377 is shifted so that the pointer 379 points to "90", the shaft 317, through the medium of the grooved collar 375 is shifted downward, as viewed in Fig. 15, a distance equal to the thickness of one of the cams. This distance is designated by arrows and indicated by the numeral 380. When this shift is made, the cam 314ª engages the roller 313 instead of the cam 314 (which is used for forty-five column records). The cam 316ª lines up with the roller 313ª, which is included in the linkage with the arm 306.

If a plurality of relays is connected to a single brush 196 there would be "flow-back" of current through unwanted circuits. Connecting each relay to an associated brush prevents flow-back, due to the fact that the circuits are energized only during the passage of the segment 194 across the tip of the plurality of brushes 196.

Although simple embodiments of the new and improved translator are herein shown and described, it is obvious that many changes may be made in these devices by those skilled in the art without departing from the spirit of the invention as defined by the following claims.

What is claimed is:

1. In a translator to be used in combination with a tabulating machine having printing elements and settable stops for said elements, said stops being normally adapted to be controlled by records having single representations; a number of interposers moving in timed relation to a portion of an operating cycle of said tabulating machine, a restraining latch associated with each of said interposers, an electro-magnet associated with each of said latches, a relay for and connected in circuit with each of said electro-magnets, a contact device adapted to be actuated by sensing pins in said tabulating machine, said device comprising a pair of contacts in operative relation with each of said sensing pins, means interconnecting said relays with said contact elements, and instrumentalities moving in timed relation to the operating cycle of said machine for energizing circuits completed by said sensing pins and including members for shifting said electro-magnets into one circuit when single representations appear in records in said machine and for shifting said magnets into other circuits when combinational representations appear in the records.

2. In a translator of the character described, for record controlled tabulating machines having mechanical sensing pins, adding and printing means and stops for controlling said adding and printing means; a contact device comprised of movable plungers actuated by said sensing pins and connected in common in rows parallel to vertical columns in the records, a plurality of contact members adapted to cooperate with said plungers, said members being arranged in rows angularly disposed relative to said first rows, and means driven by said tabulating machine for moving said contact members into and out of the range of said plungers.

3. In a translator of the character described, for tabulating machines having mechanical sensing pins, adding and printing means and stops for controlling said adding and printing means; a contact device comprised of movable plungers actuated by said sensing pins and arranged in rows, a plurality of contact members adapted to cooperate with said plungers, said members being arranged in rows angularly disposed relative to said first rows, and means driven in timed relation to the operating cycle of said tabulating machine for moving said rows of contact members into and out of the range of said plungers.

4. In a translator of the character described, for tabulating machines having mechanical sensing pins, adding and printing means and stops for controlling said adding and printing means; a contact device comprised of movable plungers actuated by said sensing pins and arranged in rows, a plurality of contact members adapted to cooperate with said plungers, said members being arranged in rows angularly disposed relative to said first rows, and means driven by said tabulating machine and operable when said sensing pins engage a record for moving said contact members relative to said plungers.

5. In a translator of the character described, for tabulating machines having mechanical sensing pins, adding and printing means and stops for controlling said adding and printing means; a contact device comprised of movable plungers actuated by said sensing pins and arranged in rows, a plurality of contact members adapted to cooperate with said plungers, said members being arranged in rows angularly disposed relative to said first rows, cams driven in timed relation to a portion of the operating cycle of the tabulating machine, one cam being provided for each row of contact members, and linkage between said cams and said rows of contact members adapted in cooperation with said cams to successively move said rows of members into and out of the range of said plungers.

6. In a translator of the character described, for tabulating machines having mechanical sensing pins, adding and printing means and stops for controlling said adding and printing means; a contact device comprised of a plurality of movable plungers one for and actuated by each of said sensing pins, said plungers being arranged in rows, each row consisting of a plurality of groups of plungers, each group electrically connected in common, contact members adapted to be contacted by said plungers and arranged in rows at substantially right angles to said first rows, and a multiple switch including a contact arm for and connected to each of said groups of plungers and adapted, when closed, to connect all of said plungers in each row in common.

7. In a translator of the character described, for tabulating machines having mechanical sensing pins, adding and printing means and stops for controlling said adding and printing means; a contact device comprised of a plurality of movable plungers one for and actuated by each of said sensing pins, said plungers being connected in common in rows in one direction, contact members adapted to be contacted by said plungers and arranged in rows substantially at right angles to said first rows, electrically controlled stop setting members cooperating with said stops; electrical circuits including said contact members and plungers, and the controls of said stop setting members; an impulse distributor rotor driven in timed relation to said machine and having a long and a short sector connected in common and adapted to be connected to one polarity of a source of current during a definite portion of the working cycle of the machine, a group of brushes adapted to be engaged by the long sector and successively connected to and disconnected from said source of current, a second group of brushes adapted to be engaged by said short sector and successively connected to and disconnected from said source, and a multiple double-throw switch interconnected with said groups of brushes, the controls of said stop setting members and said rows of contact members for individually connecting said rows of contact members in circuit with brushes in said first group, when said switch is in one position, and for connecting a plurality of rows of contactors in multiple with brushes in said second group when the switch is in another position.

8. A translator as claimed in claim 7 in which the connection between the sector and the source of current is provided with two mechanical interrupters in series, one of said interrupters having a cam adapted to close its contacts after the first two brushes in said first group have been engaged by the long sector and adapted to open said contacts just before the trailing end of the long sector is disengaged from the first brush it engaged, the other interrupter having a cam adapted to close its contacts just after a brush of said second series is engaged by the short sector and adapted to open just before the short sector becomes disengaged from said brush of the second series, and switching means associated with said interrupters for disabling one while the other is operating.

9. A translator as claimed in claim 7 in which the connection between the sectors and the source of current is provided with two mechanical interrupters of different timing, and in which said multiple double-throw switch is provided with means for disabling one of the interrupters when said switch is in one position, and for disabling the other of said interrupters when the switch is in its other position.

10. In a translator for tabulating machines having mechanical sensing pins, adding and printing means and stops for controlling said adding and printing means; a contact device comprised of movable plungers actuated by said sensing pins and connected in common in rows in one direction, a plurality of contact members adapted to cooperate with said plungers, said members being connected in common in rows angularly disposed relative to said first rows, electrically controlled stop setting members cooperating with said stops; electrical circuits including said contact members and plungers, and the controls of said stop setting members; an impulse distributor driven in timed relation to the operating cycle of said tabulating machine, said distributor having one set of brushes cooperating with one segment thereof and a second set of brushes cooperating with a second segment thereof, one of said segments being of greater circumferential length than the other, and a multiple switch interconnected with both of said sets of brushes and with said circuits for selectively including either of said sets of brushes in said electrical circuits.

11. In a translator for tabulating machines having mechanical sensing pins, adding and printing means and settable stops for controlling said adding and printing means; a contact device comprised of movable plungers actuated by said sensing pins and connected in common in rows in one direction, a plurality of contact members to cooperate with said plungers, said members being connected in common in rows in a direction angularly disposed relative to said first rows, electrically controlled stop setting members cooperating with said stops; electrical circuits including said contact members and plungers, and the controls of said stop setting members; an impulse distributor driven in timed relation to the operating cycle of said tabulating machine, said distributor having one set of brushes cooperating with one segment thereof and a second set of brushes cooperating with a second segment thereof, one of said segments being of greater circumferential length than the other, some of said brushes being individually connected to said contact members and others of said brushes each being connected to a plurality of said contact members, and a multiple switch having one portion thereof connected between the individually connected brushes and the contact members, and another portion connected between the plurally connected brushes and contact members for selectively including either of said sets of brushes in the electrical circuits of said translator.

12. In a translator for tabulating machines having mechanical sensing pins, adding and printing means and stops for controlling said adding and printing means; a contact device comprised of movable plungers actuated by said sensing pins and connected in common in rows in one direction, a plurality of contact members cooperating with said plungers and connected in common in rows in a direction angularly disposed relative to said first rows, electrically controlled stop setting members cooperating with said stops; electrical circuits including said contact members and plungers, and the controls of said stop setting members; an impulse distributor driven in timed relation to the operating cycle of said tabulating machine, said distributor having one set of brushes cooperating with one segment thereof and a second set of brushes cooperating with a second segment thereof, one of said segments being of greater circumferential length than the other, individual connections between the brushes cooperating with said segment of greater circumferential length and said contact members, group connections between said contact members and the brushes cooperating with the other of said segments; and switching means interconnected with said electrical circuits, said individual connections and said group connections for selectively including either of said segments into the electrical circuits of said translator.

13. In a record controlled machine of the pin sensing type, including mechanically operative accumulating and printing elements in groups and settable stops for governing the operation of said elements, the combination with a translator comprising contacts actuated by said pins, a plurality of moving interposers for setting stops when released, a release magnet associated with each of said interposers and included in a circuit with some of said contacts, and means for controlling the release magnet circuits, including a relay for each magnet, to cause a release magnet to operate upon the appearance of a single hole in a given column of said record at the sensing means, and adapted through the medium of one of the relays to cause the operation of the release magnet to occur at a different timing when one hole appears in a predetermined position and another hole appears in any of the remaining positions in said column of the record.

14. In a translator of the character described for record controlled tabulating machines having mechanical sensing pins, adding and printing means and stops for controlling the same; a contact device comprised of movable plungers actuated by said sensing pins, said plungers being arranged in rows parallel to vertical columns in the records, two rows in endwise relation for each of said columns, a plurality of contact members each adapted to be engaged by one of said plungers, said members being connected in common and arranged in rows angular with respect to said first rows, means driven by said machine for moving said rows of contact members into and out of the range of said plungers, and an emitter interconnected to said rows of contact members and adapted to supply energy to the latter while they are in the range of said plungers.

15. In a record controlled device employing combinational hole records, an analyzer adapted to sense said records when the same are at rest, adding and printing means and stops for effecting set-ups therein, a translator for actuating said stops and including a plurality of stop setters each moving along a path adjacent to a corresponding row of said stops, means tending to move said stop setters in a direction angular with respect to said path to set up said stops, electrical means restraining said stop setters against said last means, an emitter, relays interconnected in circuits with said electrical means, said analyzer and said emitter, and mechanically operated switching means moving in timed relation to said emitter and interconnected with said circuits for rendering said relays effective for actuation by impulses instituted by one hole appearing in a predetermined position in a two index point combination, thereby completing another of said circuits between said analyzer and said electrical means so that an impulse instituted by the other index point of the combination may be delivered to said electrical means to effect a set-up in said adding and printing means.

16. In a machine controlled by records having combinational representations including a record analyzer, type-carrying members and settable stops for controlling the positions of said members, the combination with a translating mechanism between said analyzer and said stops, a plurality of moving interposers each having an associated electrical release, each release having associated therewith a control relay having its contact circuits connected thereto, an electromagnetic winding for each relay, circuits between said windings and said analyzer including completing means driven by said machine for causing said windings to be energized by impulses instituted by those perforations of two index combinational representations which appear in predetermined positions in the record, whereby impulses instituted by the second index points of said representations may pass via circuits completed by said relays to said electrical releases, and resetting means for said relays to complete normal circuits through which impulses instituted by single index point representations in the record may pass directly to said electrical releases.

17. In a record controlled device adapted to be controlled by combinational records, a record feeder, an analyzer for reading said records, adding and printing means, a translator for controlling set-ups in said means and including interposers moved in definite timed relation with the record cycles of said machine, release magnets for said interposers, a relay associated with each of said magnets, contacts adapted to be closed by said analyzer, circuit means interconnecting said contacts, said magnets and said relays, each relay including switching means for connecting its release magnet in a circuit to be energized due to a second hole of a combinational designation, return circuits for said magnets and the actuating coils of said relays, an impulse distributor for successively energizing horizontal rows of said contacts and the circuits connected thereto, mechanism in said translator including a rotary switch connected in said return circuits and adapted to render said relays effective upon the appearance of perforations in a predetermined horizontal row in the records and adapted to render said release magnets effective upon the appearance of perforations in all other horizontal rows of said record other than said first horizontal row, thereby effecting the translation of both single hole designations and two hole designations one hole of which appears in said predetermined horizontal row.

18. In a translator to be used in combination with a tabulating machine, a plurality of interposers moving in timed relation to a portion of an operating cycle of said tabulating machine, an electrical release associated with each of said interposers, a control relay for each of said releases, a contact device adapted to be actuated by a sensing means in said tabulating machine, said device having banks of contact elements arranged in groups corresponding to halves of the vertical columns of a record card, and switching means having circuits connected to said electrical releases, said relays and said contactors, an impulse distributor connected to said switching means adapted to supply a series of impulses corresponding to the index points in single index point records, and a second impulse distributor connected to said switching means and adapted to supply impulses corresponding to combinational index points, said switching means being adapted when in one position to connect said first impulse distributor in circuits with said contacts and said electrical releases to effect the release of said interposers in accordance with perforations appearing in standard or single index point records, and said switching means being adapted when in another position to connect said banks of contactors in parallel half columns and to connect said parallel half columns in circuits with said second distributor, said relays and said electrical releases, thereby placing said releases directly under control of impulses corresponding to single index point combinational representations, and placing said relays under control of those impulses corresponding to one index point of two index point combinational representations which appear in predetermined positions in the record to cause said relays to complete other circuits via which impulses corresponding to the other index positions of the two index point representations may pass to said electrical releases.

19. In a translator to be used in combination with a tabulating machine, a number of interposers moving in timed relation to a portion of an operating cycle of said tabulating machine, an electrical release associated with each of said interposers, a control relay associated with each of said releases, a contact device adapted to be actuated by a sensing means in said tabulating machine, said device having banks of contact elements arranged in groups corresponding to halves of the vertical columns of a record card, an impulse distributor adapted to supply a series of impulses of definite timing, a second impulse distributor adapted to supply a series of impulses via parallel connections to said contacts, and switching means connected to said impulse distributors, said contacts, said relays and said releases; said switching means being adapted when in one position to connect the half column groups of contactors together to correspond to a full record column and to connect said contactor, said first distributor and said electrical releases in circuits to be controlled by impulses from said first distributor where a standard type of record is used; and adapted when in its other position to connect the half column groups of contactors in parallel and to connect the same to said relays, said second distributor, and said electrical releases, thereby enabling impulses corresponding to single perforations to directly control said releases, and impulses corresponding to multiple perforations to control said releases via said relays, where a combinational record is used.

20. In a translator to be used in combination with a tabulating machine, a plurality of interposers moving in timed relation to a portion of an operating cycle of said machine, an electrical release associated with each of said interposers, a control relay for each of said releases, a contact device adapted to be actuated by a sensing means in said machine, said device including banks of contact elements arranged in groups corresponding to halves of the vertical columns of a record card, an impulse distributor adapted to supply a series of impulses, a second impulse distributor adapted to supply a series of impulses via parallel connections to said contacts, and switching means connected to said impulse distributors, said contacts, said relays and said releases; said switching means being adapted when in one position to connect the half column groups of contactors together to correspond to a full record column and to short circuit said relays to render them inoperative, and to connect said contactor, said first distributor and said electrical releases in circuits to receive impulses from said first distributor under control of one type of record card; and adapted when in its other position to connect the half column groups of contactors in parallel and to connect the same to said relays, said second distributor, and said electrical releases, thereby enabling impulses corresponding to single perforations to directly control said releases, and impulses corresponding to multiple perforations to control said releases via said relays, where a combinational type of record is used.

21. In a translator of the character described for record controlled machines having mechanical sensing pins, adding and printing mechanism having stops for controlling set-ups therein; a contact device comprised of a plurality of spring plungers each adapted to be actuated by one of said sensing pins, said plungers being arranged in rows parallel to the vertical columns in the records, each row including a first group of plungers electrically connected in common and a second group of plungers also connected in common, a contact member for each of said plungers, said contact members being connected in common and arranged in rows at substantially right angles to said first rows, and a multiple switch including contact arms connected to said first groups of plungers and other contact arms connected to said second groups of plungers, whereby when said switch is open said groups of plungers are electrically disconnected from each other permitting combinational hole records to be utilized, and when said switch is closed the groups of plungers in each of said rows are connected in common permitting the use of a standard record.

LINCOLN M. KEEFE.